US012700801B2

(12) United States Patent
Kadlimatti

(10) Patent No.: US 12,700,801 B2
(45) Date of Patent: Aug. 4, 2026

(54) MICROCONTROLLER AND ASSOCIATED POWER MANAGEMENT UNIT

(71) Applicant: TEXAS INSTRUMENTS INCORPORATED, Dallas, TX (US)

(72) Inventor: Venkatesh Kadlimatti, Hubli (IN)

(73) Assignee: Texas Instruments Incorporated, Dallas, TX (US)

( * ) Notice: Subject to any disclaimer, the term of this patent is extended or adjusted under 35 U.S.C. 154(b) by 148 days.

(21) Appl. No.: 18/680,923

(22) Filed: May 31, 2024

(65) Prior Publication Data

US 2025/0373159 A1 Dec. 4, 2025

(51) Int. Cl.
H02M 3/158 (2006.01)
H02J 7/00 (2006.01)
H02J 7/80 (2026.01)

(52) U.S. Cl.
CPC .............. H02M 3/158 (2013.01); H02J 7/80 (2026.01); H02J 7/855 (2026.01); *H02J 2207/20* (2020.01)

(58) Field of Classification Search
CPC .. H02M 3/158; H02J 7/80; H02J 7/855; H02J 2207/20

USPC .......................................................... 323/271
See application file for complete search history.

(56) References Cited

U.S. PATENT DOCUMENTS

| | | | |
|---|---|---|---|
| 2007/0216558 A1* | 9/2007 | Tsunakawa ........... | H03M 1/466 |
| | | | 341/144 |
| 2008/0048738 A1* | 2/2008 | Singnurkar ............. | G05F 3/262 |
| | | | 327/132 |
| 2018/0129234 A1* | 5/2018 | Melgar ................ | H02M 3/1588 |
| 2023/0068627 A1* | 3/2023 | Sharifi .................. | H02M 3/158 |

* cited by examiner

*Primary Examiner* — Yemane Mehari

(74) *Attorney, Agent, or Firm* — Michelle F. Murray; Frank D. Cimino

(57) ABSTRACT

In an embodiment, an integrated circuit is provided that includes first, second, third, and fourth terminals, a power converter that includes a first transistor, a second transistor, a third transistor, and a fourth transistor, and a controller configured to control the power converter. The first terminal is configured to be coupled to a battery. The first transistor is coupled to the first terminal, the second transistor, the third transistor, and the fourth transistor. The third transistor is coupled to the second terminal. The fourth transistor is coupled to the third terminal. The controller is coupled to the fourth and first terminals.

20 Claims, 14 Drawing Sheets

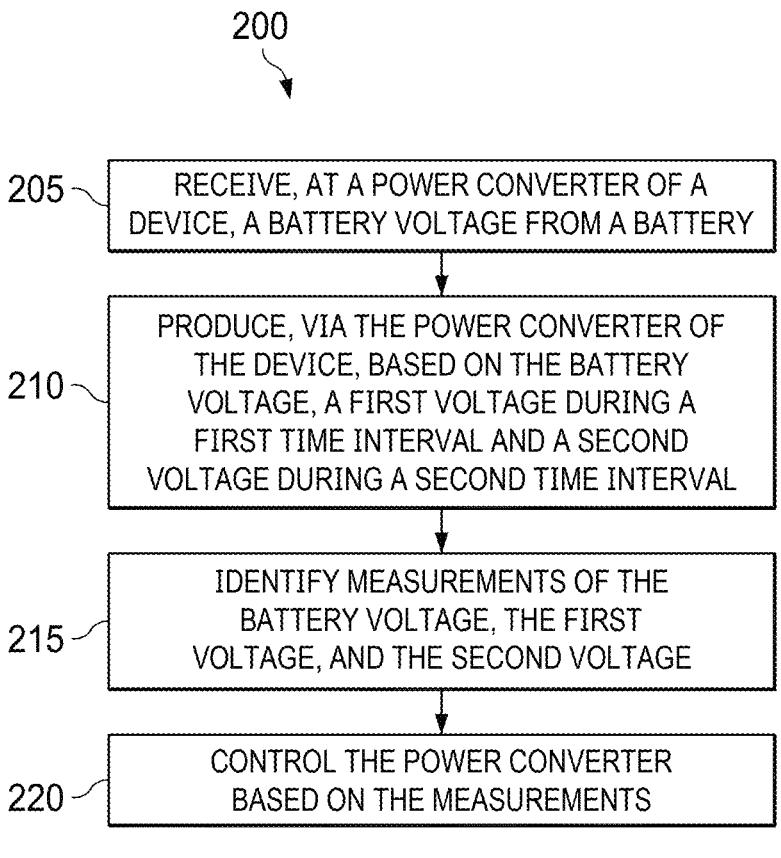

200

205 — RECEIVE, AT A POWER CONVERTER OF A DEVICE, A BATTERY VOLTAGE FROM A BATTERY

210 — PRODUCE, VIA THE POWER CONVERTER OF THE DEVICE, BASED ON THE BATTERY VOLTAGE, A FIRST VOLTAGE DURING A FIRST TIME INTERVAL AND A SECOND VOLTAGE DURING A SECOND TIME INTERVAL

215 — IDENTIFY MEASUREMENTS OF THE BATTERY VOLTAGE, THE FIRST VOLTAGE, AND THE SECOND VOLTAGE

220 — CONTROL THE POWER CONVERTER BASED ON THE MEASUREMENTS

FIG. 2

MICROCONTROLLER AND ASSOCIATED POWER MANAGEMENT UNIT

TECHNICAL FIELD

The present disclosure relates generally to an electronic system and method, and, in particular embodiments, to a microcontroller and associated power management unit.

BACKGROUND

Processing devices, such as microcontroller units (MCUs), are designed to run software programs and perform functions enabled by running the software programs. To do so, MCUs have processing nodes configured to execute software from memory and power management units to drive the processing nodes and various elements of the MCUs. The power management units often include a power supply (e.g., a battery) and one or more power converters, power-up circuits, controllers, and drivers to ensure a requisite amount of power is provided to the processing nodes at certain times. The components of an MCU, including components of the power management unit, are often designed to function within a specific voltage range. Thus, MCUs are limited in choices for a power supply based on the design constraints of the components of the MCU.

In various solutions, a processing device may include one or more buck converters or boost converters to step-down, or step-up, respectively, voltage signals in the power management unit. Thus, a buck converter may enable use of a battery with a voltage slightly higher than a desired voltage range, and a boost converter may enable use of a battery with a voltage slightly lower than a desired voltage range.

SUMMARY

In accordance to an embodiment, an integrated circuit includes: a first terminal configured to be coupled to a battery; second, third, and fourth terminals; a power converter including: a first transistor having a control terminal, and first and second current path terminals; a second transistor having a control terminal, and first and second current path terminals; a third transistor having a control terminal, and first and second current path terminals; and a fourth transistor having a control terminal, and first and second current path terminals; and a controller configured to control the power converter; where the second current path terminal of the first transistor is coupled to the first terminal, the second current path terminal of the second transistor, the first current path terminal of the third transistor, and the first current path terminal of the fourth transistor; where the second current path terminal of the third transistor is coupled to the second terminal of the integrated circuit; where the second current path terminal of the fourth transistor is coupled to the third terminal of the integrated circuit; and where the controller is coupled to the fourth terminal of the integrated circuit.

In accordance to an embodiment, an integrated circuit includes: first, second, third, and fourth terminals; a power converter including: a first transistor having a control terminal, and first and second current path terminals; a second transistor having a control terminal, and first and second current path terminals; a third transistor having a control terminal, and first and second current path terminals; and a fourth transistor having a control terminal, and first and second current path terminals; and a controller configured to control the power converter; where the first terminal is coupled to a ground node; where the second terminal is configured to be coupled to a battery; where the second current path terminal of the first transistor is coupled to the third terminal, to the second current path terminal of the second transistor, to the first current path terminal of the third transistor, and to the first current path terminal of the fourth transistor; where the second current path terminal of the third transistor is coupled to the second terminal; where the second current path terminal of the fourth transistor is coupled to the third terminal; and where the controller is coupled to the fourth terminal and to the first terminal.

In accordance to an embodiment, a system includes: a first terminal configured to be coupled to a battery; second, third, and fourth terminals; a power converter including: a first transistor having a control terminal, and first and second current path terminals; a second transistor having a control terminal, and first and second current path terminals; a third transistor having a control terminal, and first and second current path terminals; and a fourth transistor having a control terminal, and first and second current path terminals; a controller configured to control the power converter; an inductor coupled to the first terminal; a first capacitor; a second capacitor; and a third capacitor; where the second current path terminal of the first transistor is coupled to the inductor, the second current path terminal of the second transistor, the first current path terminal of the third transistor, and the first current path terminal of the fourth transistor; where the second current path terminal of the third transistor is coupled to the second terminal; where the first capacitor is coupled to the second terminal; where the second current path terminal of the fourth transistor is coupled to the third terminal; where the second capacitor is coupled to the third terminal; where the controller is coupled to the fourth terminal and to the first terminal; and where the third capacitor is coupled to the fourth terminal.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2 illustrates a series of steps for controlling multiple output voltages of a power converter, in accordance with an embodiment;

The drawings are not necessarily drawn to scale. In the drawings, like reference numerals designate corresponding parts throughout the several views. In some examples, components or operations may be separated into different blocks or may be combined into a single block.

DETAILED DESCRIPTION

Figure 1:
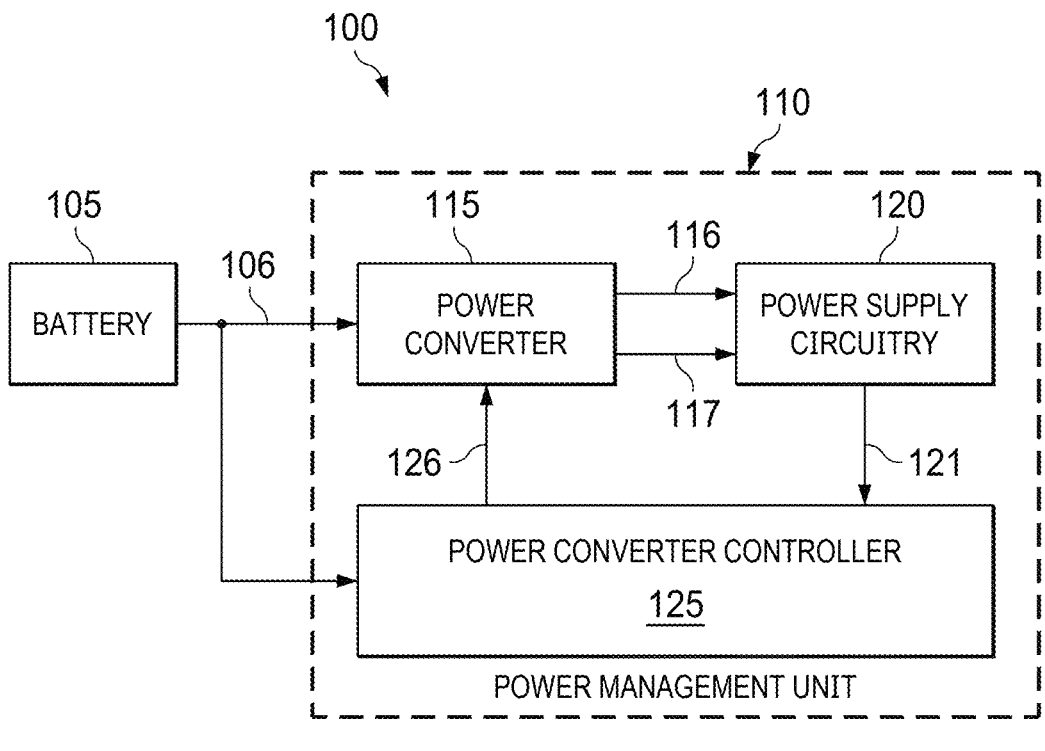
FIG. 1 illustrates an example system configurable to control multiple output voltages of a power converter, in accordance with an embodiment.

The making and using of the embodiments disclosed are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

A microcontroller may use a boost converter with a low-voltage battery. In such implementations, the load current at the input of the boost converter is higher than the current delivered by the boost converter, and the overall current drawn from the battery may be higher, which may strain the battery and reduce the lifespan of the battery over time. Such solution may include a converter topology where the output of the boost converter and the battery are shorted, which may affect the design of other components of the system.

A microcontroller may use a may use a buck-boost converter with a higher-voltage battery. Such implementations typically have limited durations where buck or boost operations can be used. Buck-boost converters generally utilize four switches and two switch pins, which can increase design cost and design area requirements.

Embodiments of the present disclosure are described in specific contexts, e.g., a (e.g., general purpose) microcontroller or processor having a power management units that can be powered using low-voltage coin-cell batteries of different voltages. In some embodiments, the power management unit may be powered by another type of voltage source, such batteries different from a coin cell, or other energy storage elements. A power management unit in accordance to some embodiments may be implemented in a device different from a general purpose microcontroller or processor, such as a custom microcontroller or processor, an application-specific integrated circuit (ASIC), a field-programmable gate arrays (FPGA), a power management integrated circuits (PMIC), or a system-on-chip (SoC).

Some embodiments relate to enhanced components, techniques, and systems related to power management units, power converters, and control of operations thereof, e.g., when supplying such devices with low-voltage coin-cell batteries.

In some embodiments, a processor can be tasked with executing software (e.g., application code) to enable functionality of an application, device, or system. To execute software, the processor may include various components, such as one or more processing cores (e.g., a central processing unit (CPU)) capable of accessing the software from memory and executing instructions and data. To drive the processing cores of the processor, the processor may include a power supply and a power management unit capable of controlling power throughout the processor. In low-power applications and systems, a battery may be coupled to a processor to provide a supply voltage to the power management unit. The power management unit may include various components, such as power converters, power-on circuitry, controllers, and drivers to generate voltages of different values for use with different elements of the processor.

In various existing solutions, battery choice is limited based on design constraints of the processor and operating voltages required thereof. Thus, often times, processors fail to function with low-voltage power supplies, such as 1.1 V or 1.2 V batteries. In some existing solutions, different types of power converters may be included to step-up or step-down the voltage provided by the power supply. However, the operable voltage ranges may be limited, and in some cases, the lifespan of the power supply may be limited as excessive current may be applied at the power supply, which can drain the battery quickly over time.

In some embodiments, a system may include a power converter that includes a single input and multiple outputs, and that can be operated such that the load current is limited while the output voltages generated by the power converter meet target values for operation of processing cores coupled to the power management unit. In this way, the power converter may provide a first output power during a first time interval and a second output power during a second time interval to reduce the strain on the battery while driving components of the system despite low-voltage power provided by the battery (e.g., 1.2 V, 1.5 V, or 3.0 V).

Advantageously, such a system can be designed to function with batteries of multiple different voltages. The system may include a node at the battery from which information about the load current and voltage of the battery can be obtained during operation of the system. The power converter of the system can output two output voltages for various use during operation, and the power converter can be controlled based on the information obtained at the battery node and based on the output voltages of the power converter, among other outputs or signals within the power management unit. Split control of the power converter's outputs may not only increase battery life of the battery by reducing load current at the input of the power converter but also increase the supply voltage range throughout the power management unit.

In an example embodiment, an integrated circuit is provided. The integrated circuit includes first, second, third, and fourth terminals, a power converter that includes a first transistor having a control terminal, and first and second current path terminals, a second transistor having a control terminal, and first and second current path terminals, a third transistor having a control terminal, and first and second current path terminals, and a fourth transistor having a control terminal, and first and second current path terminals, and a controller configured to control the power converter. The first terminal is configured to be coupled to a battery. The second current path terminal of the first transistor is coupled to the first terminal, the second current path terminal of the second transistor, the first current path terminal of the third transistor, and the first current path terminal of the fourth transistor. The second current path terminal of the third transistor is coupled to the second terminal. The second current path terminal of the fourth transistor is coupled to the third terminal. The controller is coupled to the fourth terminal and to the first terminal.

In another example, an integrated circuit that includes first, second, third, and fourth terminals, a power converter that includes a first transistor having a control terminal, and first and second current path terminals, a second transistor having a control terminal, and first and second current path terminals, a third transistor having a control terminal, and first and second current path terminals, and a fourth transistor having a control terminal, and first and second current path terminals, and a controller configured to control the power converter is provided. The first terminal is coupled to a ground node. The second terminal is configured to be coupled to a battery. The second current path terminal of the first transistor is coupled to the third terminal, the second current path terminal of the second transistor, the first current path terminal of the third transistor, and the first current path terminal of the fourth transistor. The second current path terminal of the third transistor is coupled to the second terminal. The second current path terminal of the fourth transistor is coupled to the third terminal. The controller is coupled to the fourth terminal and to the first terminal.

In yet another embodiment, a system is provided. The system includes a first terminal configured to be coupled to a battery, second, third, and fourth terminals, a power converter that includes a first transistor having a control terminal, and first and second current path terminals, a second transistor having a control terminal, and first and second current path terminals, a third transistor having a control terminal, and first and second current path terminals, and a fourth transistor having a control terminal, and first and second current path terminals, and a controller configured to control the power converter. The system also includes an inductor, a first capacitor, a second capacitor, and a third capacitor. The second current path terminal of the first transistor is coupled to the first terminal, the second current path terminal of the second transistor, the first current path terminal of the third transistor, and the first current path terminal of the fourth transistor. The second current path terminal of the third transistor is coupled to the second terminal. The first capacitor is coupled to the second terminal. The second current path terminal of the fourth transistor is coupled to the third terminal. The second capacitor is coupled to the third terminal. The controller is coupled to the fourth terminal and to the first terminal. The third capacitor is coupled to the fourth terminal.

FIG. 1 illustrates an example system configurable to control multiple output voltages of a power converter in an implementation. FIG. 1 shows system 100, which includes battery 105 and power management unit (PMU) 110. PMU 110 includes power converter 115, power supply circuitry 120, and power converter controller 125. In various embodiments, power converter controller 125 may control operations of power converter 115 via software, hardware, and/or firmware processes, such as using method 200 illustrated in FIG. 2.

In various examples, system 100 may be representative of a power system capable of obtaining power from battery 105 and distributing the power at various voltage levels to downstream components, such as processing devices, hardware accelerators, functional units or circuits, and the like. For example, system 100 may be included in an embedded device, such as a microcontroller unit (MCU), that includes various components capable of performing functions enabled via system 100. Examples of the processing devices, hardware accelerators, and functional circuits may include central processing units (CPUs), digital signal processors (DSPs), field-programmable gate arrays (FGPAs), general processing units, and other circuitry, such as transmit and receive circuitry (e.g., a transceiver), system control circuitry, and more.

Battery 105 may include one or more batteries (e.g., a coin cell battery) that produces and outputs a voltage within a voltage range. For example, battery 105 may be a 1.2V battery, a 1.5V battery, or a 3.0V battery, among batteries of other voltages and voltage ranges. In some examples, battery 105 may be included on-chip of an embedded system including PMU 110. In some examples, battery 105 may be off-chip, or external, relative to PMU 110. In operation, battery 105 may be configured to couple to power converter 115 and power converter controller 125 of PMU 110 and supply power converter 115 and power converter controller 125 with battery voltage 106.

PMU 110 may be representative of one or more components and circuits capable of obtaining battery voltage 106, converting battery voltage 106 to a lower or higher voltage, and initiating and driving operations of other components of a system via the converted voltages. PMU 110 may include power converter 115, power supply circuitry 120, and power converter controller 125, which may each be coupled together at various nodes within PMU 110.

Power converter 115 may include a power converter operable in a boost mode, a single-input-multiple-output (SIMO) mode, and a buck mode. Power converter 115 may include various transistors controllable by power converter controller 125 via control signals 126 which enable operation of power converter 115 in one of the modes. In the boost mode or the buck mode, power converter 115 can produce and provide output 116, which may include a signal increased or decreased by power converter 115 based on the mode, to power supply circuitry 120. In the SIMO mode, power converter 115 can produce and provide outputs 116 and 117 to power supply circuitry 120.

Power supply circuitry 120 may be representative of one or more start-up circuits, regulator circuits, voltage reference circuits, and the like capable of receiving outputs 116 and/or 117 and providing voltage signals 121 to power converter controller 125. For example, power supply circuitry 120 may include one or more of a power-on-reset (POR) circuit, a bandgap reference circuit, a brown-out detector (BOD) circuit, a low-dropout (LDO) circuit, and the like. Power supply circuitry 120 may also be coupled to other elements of a system (e.g., a processor) to provide outputs 116 and/or 117, among other reference voltages, to the other elements to enable operation thereof.

Power converter controller 125 may be representative of a control circuit capable of driving operations of power converter 115 based on voltage signals 121 and battery voltage 106. In various examples, power converter controller 125 includes various electrical elements, such as transistors, resistors, inductors, capacitors, switches, comparators, a finite state machine (FSM), and the like. In response to receiving voltage signals 121, power converter controller 125 may provide control signals 126 to elements of power converter 115 to control operations thereof. For example, power converter 115 may include a number of transistors that may each be coupled to receive a different one of control signals 126, and a respective control signal may turn a corresponding transistor on or off to enable a mode of power converter 115.

In some embodiments, battery 105 may be a coin cell battery. Other battery types or energy storage elements, such as battery that are not of the coin cell type, may also be used.

In operation, during a start-up or pre-charge phase, battery 105 may provide battery voltage 106 to power converter 115 and to power converter controller 125. In a first configuration (e.g., integrated circuit 301 of FIG. 3A), power converter 115 may be configured to operate in a boost mode during this phase to initialize elements of power supply circuitry 120 and power converter controller 125 if battery voltage 106 falls below a threshold battery voltage. In a second configuration (e.g., integrated circuit 302 of FIG. 3B), power converter 115 may be configured to operate in a buck mode to initialize such elements if battery voltage 106 exceeds a threshold battery voltage.

In some embodiments, in the boost mode, power converter 115 may be configured to convert battery voltage 106 to a higher voltage and produce output 116 with a voltage higher than battery voltage 106.

In some embodiments, in the buck mode, power converter 115 may be configured to convert battery voltage 106 to a lower voltage and produce output 116 with a voltage lower than battery voltage 106.

Still referring to the start-up phase, power supply circuitry 120 may be coupled to receive output 116 and compare output 116 to one or more threshold voltage values. If output 116 exceeds a threshold voltage value, power supply circuitry 120 may provide output signals 121 indicative of output 116 exceeding the threshold voltage to power converter controller 125. Based on output signals 121 and battery voltage 106, power converter controller 125 may provide control signals 126 to power converter 115 to control operation thereof. In the first configuration (e.g., integrated circuit 301 of FIG. 3A), power converter controller 125 may control power converter 115 to operate in the boost mode or to direct power converter 115 to operate in the SIMO mode during subsequent operational phases, such as a run-time phase. When directed to operate in the boost mode during the run-time phase, power converter 115 may generate output 116. When directed to operate in the SIMO mode during the run-time phase, power converter 115 may generate output 116 and output 117 based on battery voltage 106. In the second configuration (e.g., integrated circuit 302 of FIG. 3B), power converter controller 125 may control power converter 115 to enable or disable the buck mode during operational phases.

In various examples, power converter controller 125 may identify measurements of battery voltage 106, output 116 and/or output 117, and voltage signals 121 and control power converter 115, via control signals 126, based on the identified measurements. For example, during the run-time phase, based on battery voltage 106 falling below a threshold battery voltage, power converter controller 125 may enable power converter 115 to operate in the SIMO mode. Based on output 116 and/or output 117 exceeding a threshold output voltage, power converter controller 125 may enable power converter 115 to operate in another mode, such as the boost mode or the buck mode. As such, power converter controller 125 can ensure a sufficient amount of power is being driven to the processing devices and circuits coupled to PMU 110 while also ensuring battery 105 is not depleted or damaged. It follows that power converter controller 125 may be configured to select an operation mode of power converter 115 based on battery voltage 106 measured at a pin that couples battery 105 to PMU 110.

FIG. 2 illustrates a series of steps for controlling multiple output voltages of a power converter in an implementation. FIG. 2 shows method 200, which references elements of FIG. 1. Method 200 may be implemented by one or more elements of a processing system or a power management system, such as power converter controller 125 of system 100. Accordingly, method 200 may be implemented in software, hardware, firmware, or combinations or variations thereof.

In operation 205, power converter 115 may be configured to receive battery voltage 106 from battery 105. Battery 105 may include one or more batteries (e.g., a coin cell battery) that produces and outputs a voltage within a voltage range. For example, battery 105 may be a 1.2V battery, a 1.5V battery, or a 3.0V battery, among batteries of other voltages and voltage ranges. In some examples, battery 105 may be configured to couple to a battery pin or pad or port of PMU 110 to provide battery voltage 106 to power converter 115.

In operation 210, power converter 115 may be configured to produce, based on battery voltage 106, a first voltage (output 116) during a first time interval and a second voltage (output 117) during a second time interval. In various examples, power converter 115 may include a converter operable in both a boost mode and a single-input-multiple-output (SIMO) mode. In some examples, the converter of power converter 115 may also be operable in a buck mode. In the boost mode, power converter 115 may be configured to output one of the first voltage or the second voltage. In the SIMO mode, power converter 115 may be configured to output the first voltage and the second voltage at different time intervals of varying durations.

In operation 215, power converter controller 125 may be configured to identify measurements of battery voltage 106, output 116, and output 117. Power converter controller 125 may be representative of a control circuit capable of driving operations of power converter 115 based on voltage signals 121 and battery voltage 106 during run-time operations of system 100. In various examples, power converter controller 125 includes various electrical elements, such as transistors, resistors, inductors, capacitors, switches, comparators, a finite state machine (FSM), and the like. In various examples, power converter controller 125 may be configured to couple to the battery pin and identify a status or indication of battery voltage 106 at the battery pin. Additionally, power converter controller 125 may be coupled to power supply circuitry 120 to receive voltage signals 121 that may include indications of voltage values at various nodes of PMU 110, including voltage values of output 116 and output 117.

In response to receiving voltage signals 121, in operation 220, power converter controller 125 may provide control signals 126 to elements of power converter 115 to control operations thereof. For example, power converter 115 may include various transistors controllable by power converter controller 125, via control signals 126, which enable operation of power converter 115 in one of the modes (e.g., boost mode, SIMO mode). In the boost mode, power converter 115 can produce and provide output 116 to power supply circuitry 120 during the first time interval. In the SIMO mode, power converter 115 can produce and provide outputs 116 and 117 to power supply circuitry 120 during the second time interval. In some configurations where power converter 115 may operate as a buck converter, power converter 115 can produce and provide output 116 to power supply circuitry 120.

By way of a first example, during run-time operations following a start-up phase whereby elements of system 100 may be initialized to receive and operate at pre-determined voltage levels, power converter controller 125 may identify battery voltage 106 and compare battery voltage 106 to a first threshold voltage. Based on the measurements of battery voltage 106, power converter controller 125 may determine that battery voltage 106 falls below the first threshold voltage. In response to battery voltage 106 falling below the first threshold voltage, power converter controller 125 may be configured to decrease a duration of the second time interval, such that power converter 115 produces output 117 with a lower voltage relative to the voltage of output 117 produced during the second time interval with the first duration.

By way of a second example, power converter controller 125 may identify the voltage value of output 117 based on voltage signals 121 and compare output 117 to a second voltage threshold. Based on the measurements of output 117, power converter controller 125 may determine that output 117 exceeds the second threshold voltage. In response to output 117 exceeding the second threshold voltage, power converter controller 125 may be configured to decrease a duration of the second time interval, such that power converter 115 produces output 117 with a lower voltage relative to the voltage value of output 117 identified by power converter controller 125.

Following the second example, in response to power converter controller 125 determining that output 117 falls below the second threshold voltage, power converter controller 125 may be configured to increase the duration of the second time interval. In this way, power converter 115 may produce output 117 with a higher voltage relative to the voltage of output 117 produced during the second time interval with the first duration.

In the above examples, power converter controller 125 may be configured to adjust the duration of the first time interval based on a change to the duration of the second time interval. In an example, power converter controller 125 may adjust the first time interval proportionally relative to the second time interval. Thus, if power converter controller 125 increases the duration of the second time interval by a first amount, power converter controller 125 may increase the duration of the first time interval by the first amount. Similarly, if power converter controller 125 decreases the duration of the second time interval by a first amount, power converter controller 125 may decrease the duration of the first time interval by the first amount. Other variations and combinations may be contemplated.

Further, during run-time operation, power converter controller 125 may be configured to control power converter 115 to charge an inductor of PMU 110 coupled to power converter 115 during a third time interval. During this third time interval, the transistors of power converter 115 may be turned off based on control signals 126 provided by power converter controller 125. In this way, an inductor of PMU 110 may be charged via battery voltage 106, and power converter 115 may be controlled to not produce and provide outputs 116 and/or 117 downstream to power supply circuitry 120 during the third time interval.

In various examples, the first, second, and third time intervals may be sequential intervals of time. More specifically, during SIMO operation of PMU 110, the inductor of PMU 110 may initially be charged during the third time interval. Then, power converter 115 may be configured to produce output 116 during the first time interval following the third time interval. During the first time interval, the inductor might stop being charged by battery 105, and the charge of the inductor may be used by power converter 115 to produce output 116. Following the second time interval, power converter 115 may be configured to produce output 117 also based on the charge of the inductor. Accordingly, after the second time interval, the charge of the inductor may be depleted or reduced by an amount based on outputs 116 and 117 and based on the durations of the first and second time intervals. Thus, this process may be repeated, such that power converter controller 125 can control power converter 115 to stop producing outputs 116 and 117 and begin charging the inductor during another time interval with the same or a different duration as the third time interval.

In some examples, power converter controller 125 may be configured to disable power converter 115 for a fourth time interval immediately following the second time interval and prior to the third time interval. The fourth time interval may be referred to as a blank space addition (also referred to as blanking time). The duration of the blank space addition may be determined based on battery voltage 106. Specifically, power converter controller 125 may be configured to identify battery voltage 106 and compare battery voltage 106 to a first threshold voltage. Based on the battery voltage 106 falling below the first threshold voltage, power converter controller 125 may disable the power converter for a duration of time based on a difference between the first threshold voltage and battery voltage 106.

Figure 3A:
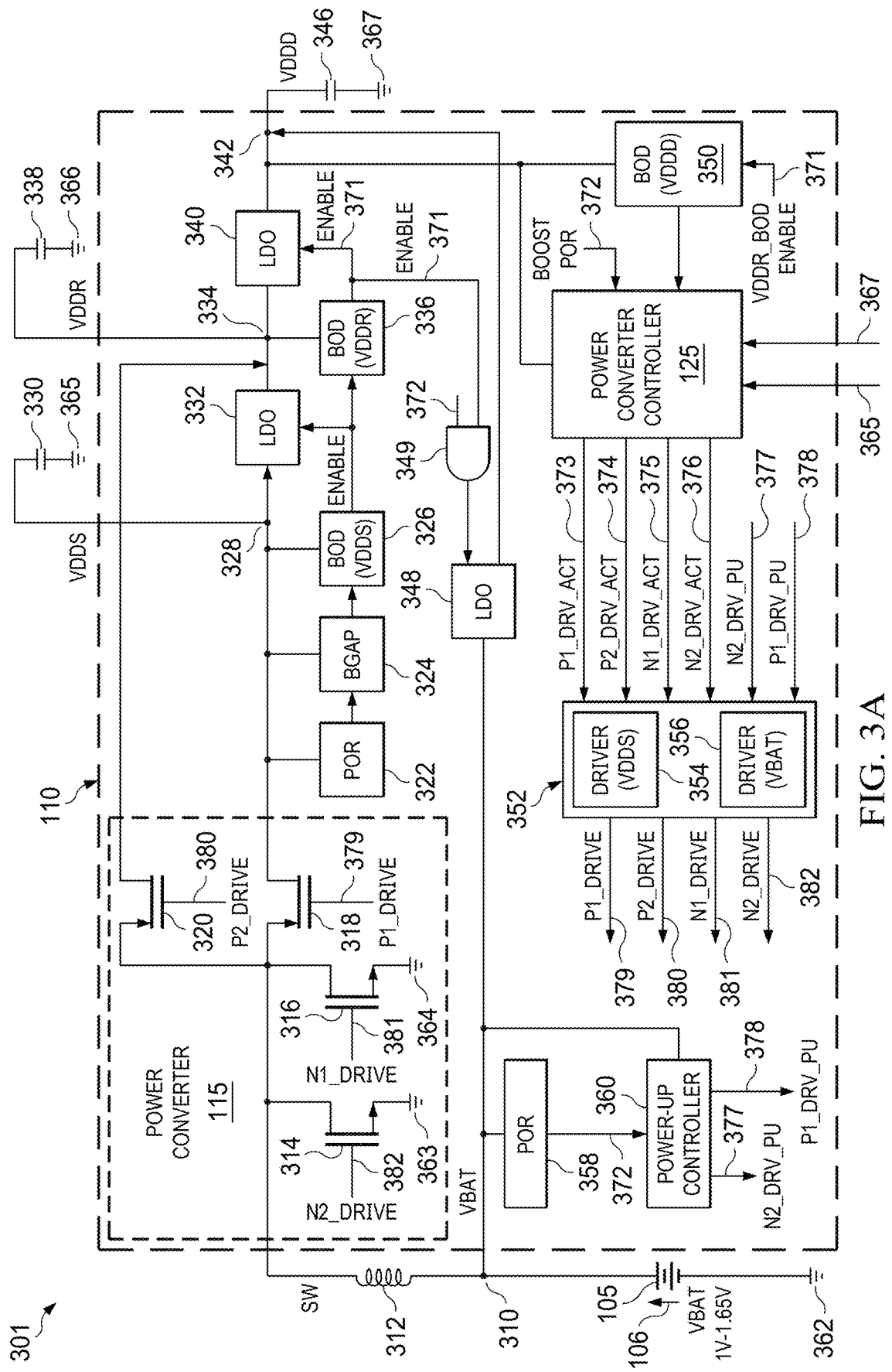
FIGS. 3A and 3B illustrate example integrated circuits in an implementation, in accordance with embodiments.
Figure 3B:
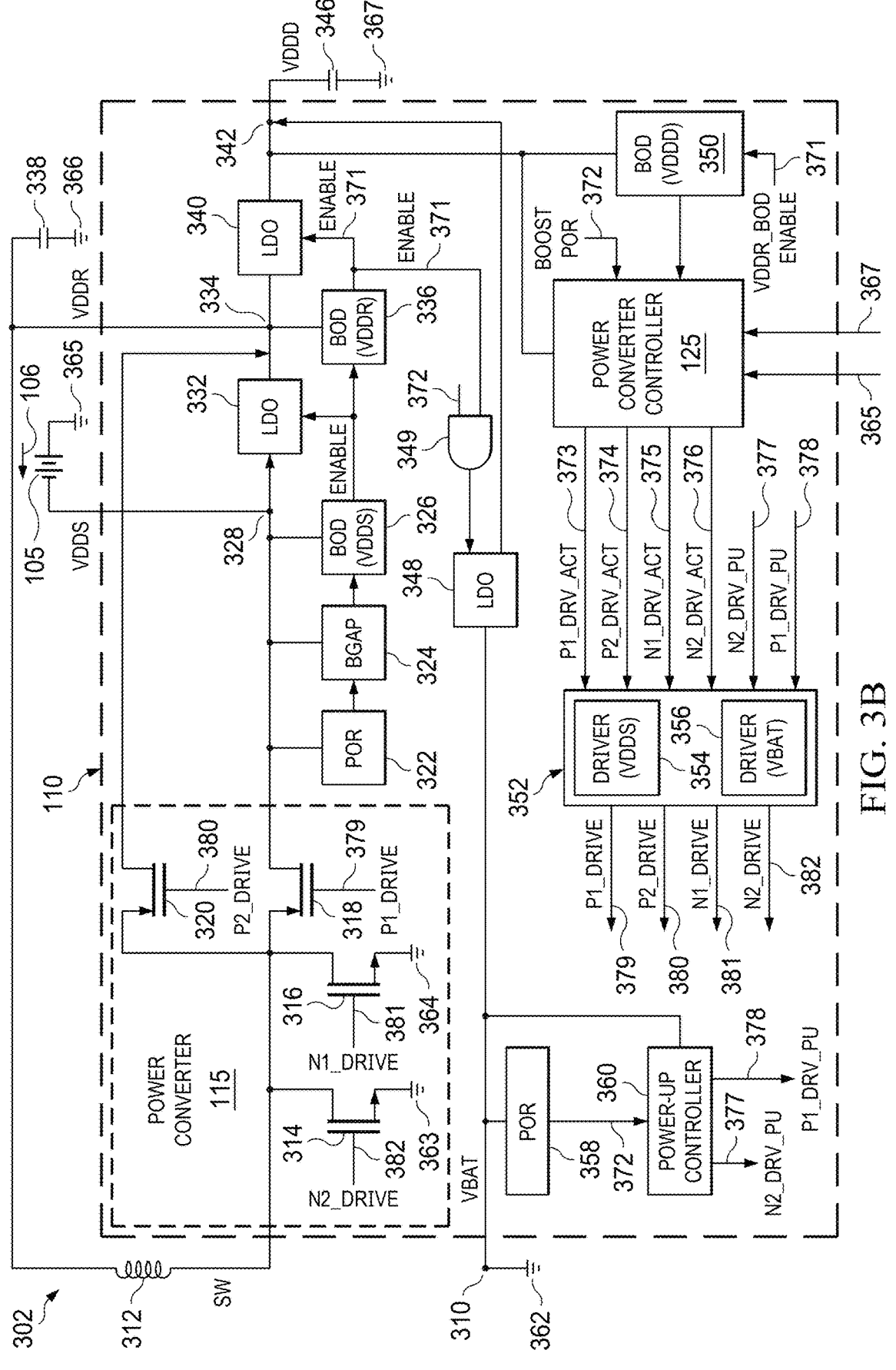

FIGS. 3A and 3B illustrate example integrated circuits in an implementation. FIG. 3A shows integrated circuit 301, and FIG. 3B shows integrated circuit 302, which both reference elements of FIG. 1. Integrated circuit 301 includes battery 105, PMU 110, and various capacitors, inductors, and other elements. PMU 110 includes power converter 115, power converter controller 125, power-on reset (POR) 322, bandgap circuit 324, brown-out detector (BOD) 326, low-dropout (LDO) 332, BOD 336, LDO 340, LDO 348, logic gate 349, BOD 350, driver 352, POR 358, and power-up controller 360. Power converter 115 further includes transistors 314, 316, 318, and 320. PMU 110 may be coupled to battery 105, inductor 312, capacitor 330, capacitor 338, and capacitor 346 at various nodes within integrated circuit 301. Integrated circuit 302 also includes battery 105, PMU 110, and various capacitors, inductors, and other elements. In some examples, integrated circuits 301 and 302 may be the same integrated circuit implemented in two different configurations.

In various examples, integrated circuits 301 and 302 may be representative of power systems capable of obtaining power from battery 105 and distributing the power at various voltage levels to downstream components, such as processing devices, hardware accelerators, functional units or circuits, and the like. For example, integrated circuits 301 and 302 may be included in an embedded device, such as a microcontroller unit (MCU), that includes various components capable of performing functions enabled via PMU 110. Examples of the processing devices, hardware accelerators, and functional circuits may include central processing units (CPUs), digital signal processors (DSPs), field-programmable gate arrays (FGPAs), general processing units, and other circuitry, such as transmit and receive circuitry (e.g., a transceiver), system control circuitry, and more.

Battery 105 may include one or more batteries (e.g., a coin cell battery) that produces and outputs a voltage within a voltage range. For example, battery 105 may be a 1.2V battery, a 1.5V battery, or a 3.0V battery, among batteries of other voltages and voltage ranges. In some examples, battery 105 includes a 1.2V battery or a 1.5V battery in a configuration illustrated in FIG. 3A. In some examples, battery 105 includes a 3.0V or higher battery in a configuration illustrated in FIG. 3B. In some examples, battery 105 may be included on-chip of an embedded system including PMU 110. In some examples, battery 105 may be off-chip, or external, relative to PMU 110.

Referring first to integrated circuit 301 of FIG. 3A, battery 105 may be configured to couple to inductor 312 and to elements of PMU 110, such as POR 358, power-up controller 360, and LDO 348 and supply each of these elements with battery voltage 106. More specifically, battery 105 may include a first terminal configured to couple to node 310 (e.g., a battery pin), to which inductor 312 and the other elements of PMU 110 are coupled, and a second terminal coupled to ground node 362.

PMU 110 may be representative of one or more components capable of obtaining battery voltage 106, converting battery voltage 106 to a, e.g., higher voltage, e.g., in the configuration of integrated circuit 301, and initiating and driving operations of other components of a system via the converted voltages. PMU 110 includes power converter 115, power converter controller 125, POR 322, bandgap circuit 324, BOD 326, LDO 332, BOD 336, LDO 340, LDO 348, logic gate 349, BOD 350, driver 352, POR 358, and power-up controller 360.

Power converter 115 may be representative of a converter operable in both a boost mode and a single-input-multiple-output (SIMO) mode in the configuration of integrated circuit 301. Power converter 115 may also be operated in buck mode.

Power converter 115 may include transistors 316, 316, 318, and 320 that each include a gate terminal, a source terminal, and a drain terminal, and that are each controllable by power converter controller 125 via signals provided to the gate terminals of the transistors. In the boost mode, power converter 115 can produce and output a first voltage (e.g., VDDS) at node 328. In the SIMO mode, power converter 115 can produce and output the first voltage (e.g., VDDS) at node 328 and a second voltage (e.g., VDDR) at node 334.

Various power supply circuits may be included in PMU 110 and coupled to nodes 328 and 334. For example, PMU 110 may include POR 322, bandgap circuit 324, BOD 326, LDO 332, BOD 336, LDO 340, LDO 348, BOD 350, driver 352, POR 358, and power-up controller 360.

POR 322 may be representative of a circuit configured to receive the first voltage (e.g., VDDS) from power converter 115, compare the first voltage to a power-on threshold voltage, and output a power-on enable signal to bandgap circuit 324 based on the first voltage meeting or exceeding the power-on threshold voltage. POR 322 may be implemented in any way known in the art.

Bandgap reference circuit 324 may be representative of a circuit configured to receive the power-on enable signal from POR 322, compare the power-on enable signal to a bandgap threshold voltage, and output a bandgap enable signal to BOD 326, and a bandgap voltage (not shown). Bandgap reference circuit 324 may be implemented in any way known in the art.

BOD 326 may be representative of a circuit configured to receive the bandgap enable signal, compare the bandgap enable signal to a brown-out threshold voltage, and output a brown-out enable signal to LDO 332 and BOD 336 based on the bandgap enable signal meeting or exceeding the brown-out threshold voltage. BOD 326 may be implemented in any way known in the art.

BOD 336 may be representative of a circuit configured to receive the brown-out enable signal and the second voltage from node 334, compare the second voltage to an LDO threshold voltage, and output an LDO enable signal to LDO 340 and LDO 348 based on the enable signal and based on the second voltage (from node 334) meeting or exceeding the LDO threshold voltage. BOD 336 may be implemented in any way known in the art.

BOD 350 may be representative of a circuit configured to receive enable signal 371 and a third voltage (e.g., VDDD) at node 342 from LDO 340, compare the third voltage to an LDO threshold voltage, and configured to output an LDO enable signal based on the received enable signal and based on the third voltage meeting or exceeding the LDO threshold voltage. BOD 350 may be implemented in any way known in the art.

POR 358 may be representative of a POR circuit configured to receive the battery voltage from battery 105 at node 310, compare the battery voltage to a battery voltage threshold, and output a boost POR enable signal 372 to LDO 348 (e.g., via logic gate 349), boost power-up controller 360, and power converter controller 125 based on the battery voltage exceeding the battery voltage threshold.

In various examples, POR 322, bandgap circuit 324, BOD 326, BOD 336, BOD 350, and POR 358 may be referred to as start-up circuitry. Such start-up circuitry may be capable of determining whether the output voltage from power converter 115 or the battery voltage from battery 105 meets respective threshold voltages to ensure safe and proper start-up of other elements of PMU 110. Each of the threshold voltages or signals used by the start-up circuits may be different relative to each other. Some of the threshold voltages or signals may be the same.

LDO 332, LDO 340, and LDO 348 may be representative of circuits configured to provide fixed or regulated voltages at nodes of PMU 110 for use downstream by other systems, devices, or circuits configured to couple to PMU 110 at such nodes. LDOs 322, 340, and 348 may be implemented in any way known in the art.

LDO 332 may be configured to receive the first voltage (e.g., VDDS) at node 328 as an input and regulate the second voltage at node 334 when power converter 115 is not operating in the SIMO mode.

LDO 340 may be configured to receive the second voltage (e.g., VDDR) at node 334 as an input, and output and regulate a third voltage (e.g., VDDD) at node 342 in some scenarios, such as when battery voltage meets or falls below a threshold voltage (e.g., VBAT≤VDDD).

LDO 348 may be configured to receive battery voltage 106 (from node 310) and an enable signal. In some embodiments, the enable signal received by LDO 348 is received from the output of logic gate 349, which in turn receives signal 371 from BOD 336 and POR enable signal 372 as inputs. In some embodiments, LDO 348, when enabled, regulates the third voltage (e.g., VDDD) at node 342 in some scenarios, such as when battery voltage 106 exceeds a threshold voltage (e.g., VBAT>VDDD).

Logic gate 349 may be representative of an AND gate coupled to receive enable signal 371 and POR enable signal 372 and provide a logical output (e.g., 0, 1) based on values of the enable signals. When both enable signals include a logical high value (1), LDO 348 may be enabled to regulate the third voltage at node 342. When the enable signals have different values, LDO 348 may be disabled, and LDO 340 may be configured to regulate the third voltage at node 342 (assuming LDO 340 is enabled).

Both LDOs 340 and 348 may operate digitally, such that they may both be controlled using digital signals. In various embodiments, either LDO 340 or LDO 348 may regulate the third voltage at node 342. In such embodiments, switching of the regulation between LDO 340 and LDO 348 may occur automatically based on battery voltage 106 and based on a voltage threshold. In this way, such regulation and switching thereof may advantageously reduce effective digital current drawn from battery 105.

Power converter controller 125 may be coupled to LDO 340 at node 342 to receive the third voltage (e.g., VDDD) and to BOD 350 and may further be coupled to receive boost POR enable signal 372 from POR 358. In some embodiments, power converter controller 125 is powered by the third voltage (e.g., VDDD).

Power converter controller 125 may be representative of a control circuit capable of controlling operations of power converter 115 based on enable signals (e.g., digital control signals 367, POR enable signal 372) and voltage signals (e.g., indications of voltage measurements) (e.g., voltage indication signals 365) at different nodes of PMU 110.

In various embodiments, controller 125 includes various electrical elements, such as transistors, resistors, inductors, capacitors, switches, comparators, logic devices, a finite state machine (FSM), and the like driven by a voltage at node 342. For example, in some such embodiments, controller 125 may include one or more comparators coupled to receive voltage indication signals 365, compare the voltage indication signals 365, and provide an indication to a FSM of controller 125. Examples of the voltage indication signals 365 may include indications of battery voltage 106, voltage of inductor 312, voltage at node 328 (e.g., VDDS), voltage at node 334 (e.g., VDDR), voltage at node 342 (e.g., VDDD), and one or more reference voltages used to compare other such voltages against. Examples of voltage indication signals 365 may include battery voltage signal 430, first voltage signal 432, first voltage signal 434, and second voltage signal 436 of FIG. 4. Examples of the digital control signals 367 may include enable signals from one or more elements of PMU 110 or from a processor coupled to power converter controller 125 (e.g., peak current signal 431 of FIG. 4). Controller 125 may also be implemented using a processor coupled to a memory and configured to execute instructions such memory.

In some embodiments, in response to the assertion of boost POR enable signal 372, the output of BOD 350, voltage indication signals 365, and digital control signals 367, controller 125 may provide control signals 373, 374, 375, and 376 to driver 352.

Boost power-up controller 360 may be representative of another control circuit capable of driving operations of power converter 115 during a boost mode based on an assertion of the output of LDO 348 and boost POR enable signal 372 from POR 358. Boost power-up controller 360 may be configured to provide control signals 377 and 378 to driver 352.

In various embodiments, controller 360 includes various electrical elements, such as transistors, resistors, inductors, capacitors, switches, comparators, a finite state machine (FSM), and the like driven by a voltage at node 342. Controller 360 may also be implemented using a processor coupled to a memory and configured to execute instructions such memory.

In some embodiments, controller 125 and boost power-up controller 360 may be implemented as a single controller.

Driver 352 may be representative of a circuit or control device capable of driving operation signals 379, 380, 381, and 382 to transistors 318, 320, 316, and 314, respectively, of power converter 115 based on control signals 373, 374, 375, 376, 377, and 378. Driver 352 may include output voltage driver 354 and battery voltage driver 356.

Output voltage driver 354 may be configured to determine values for operation signals 379, 380, 381, and 382 based on voltages output by power converter 115 at various nodes of PMU 110 (e.g., node 328, node 334, node 342).

Battery voltage driver 356 may be configured to determine values for operation signals 379, 380, 381, and 382 based on the battery voltage measured at node 310.

Based on the values of operation signals 379, 380, 381, and 382, the transistors of power converter 115 may be enabled or disabled at different intervals of time of varying durations. More specifically, in an embodiment, during a pre-charge phase or a start-up phase, as the battery voltage reaches a threshold battery voltage, POR 358 may enable boost power-up controller 360 to provide control signals 377 and 378 to driver 352. Driver 352 may be configured to provide operation signals 381 and 382 to transistors 316 and 314 of power converter 115, respectively, to enable power converter 115 to operate in a charging mode for an interval of time. In particular, output voltage driver 354 may be configured to provide operation signal 379 to transistor 318, operation signal 380 to transistor 320, operation signal 381 to transistor 316, and operation signal 382 to transistor 314. Transistor 314 may be included in power converter 115 to avoid short circuit issues caused due to battery 105 including a low-voltage battery. During this charging phase, transistors 314 and 316 may operate in a closed state, or like closed switches, while transistors 318 and 320 may operate in an open state, or like open switches, based on respective operation signals provided by output voltage driver 354. Thus, during this time interval, current may flow from battery 105 through transistors 314 and 316 and inductor 312 may be charged.

Still referring to integrated circuit 301 of FIG. 3A, in an embodiment, during a boost phase, as battery voltage 106 (e.g., VBAT) reaches a threshold battery voltage, POR 358 may enable boost power-up controller 360 to provide control signals 377 and 378 to driver 352. Driver 352 may be configured to provide operation signals 379 and 382 to transistors 318 and 314 of power converter 115, respectively, to enable power converter 115 to operate in a boost mode for an interval of time. In this example, output voltage driver 354 may be configured to provide operation signal 379 to transistor 318, and battery voltage driver 356 may be configured to provide operation signal 382 to transistor 314. During this boost phase, transistor 318 may be configured to output a first voltage (e.g., VDDS), based on battery voltage 106, to POR 322 and to node 328. POR 322 may be configured to determine whether the first voltage reaches a threshold voltage. In response to determining that the first voltage exceeds the threshold voltage, POR 322 can enable bandgap circuit 324, which can enable BOD 326, which can further enable LDO 332. LDO 332 can produce a regulated second voltage (e.g., VDDR) at node 334 for use by BOD 336 and LDO 340, among other elements internal and external to PMU 110. In response to being enabled by BOD 336, LDO 340 can produce a regulated third voltage (e.g., VDDD) at node 342, which can be supplied to BOD 350, power converter controller 125, and other elements external to PMU 110. BOD 350 can compare the regulated third voltage to a threshold voltage and enable power converter controller 125 based on the third voltage being above the threshold voltage. Then, power converter controller 125 may be configured to control operations of power converter 115.

Following the boost phase where power converter controller 125 is enabled via BOD 350, power converter controller 125 may be configured to enable power converter 115 to operate in a SIMO mode. Specifically, to enable the SIMO mode, power converter controller 125 may provide control signals 373, 374, 375, and 376 to driver 352, and driver 352, or more specifically output voltage driver 354 of driver 352, can output operation signals 379, 380, and 381 to transistors 318, 320, and 316, respectively. Accordingly, transistors 316, 318, and 320 may turn on and off during different intervals of time based on operation signals 379, 380, and 381. When on, transistor 318 may be configured to provide a first output voltage to node 328 (e.g., VDDS), and transistor 320 may be configured to provide a second output voltage to node 334 (e.g., VDDR). During the SIMO mode, LDO 332 may be disabled (e.g., with the output of LDO 332 at high impedance) to stop regulating the voltage at node 334. While power converter 115 operates in the SIMO mode, power converter controller 125 may be configured to obtain measurements of battery voltage 106 (e.g., VBAT), the first output voltage at node 328, and the second output voltage at node 334 and adjust durations that each of the transistors of power converter 115 are turned on or off based on the measurements.

Referring now more specifically to integrated circuit 301 and the topology thereof, integrated circuit 301 shows a first topology of the aforementioned elements where battery 105 is a 1.2 V or a 1.5 V battery. In this first topology, battery 105 is configured to couple to node 310 at a first terminal of battery 105 and to ground terminal 362 at a second terminal of battery 105. Various elements of integrated circuit 301 are also coupled to node 310. Inductor 312 includes a first terminal and a second terminal. The first terminal of inductor 312 is coupled to node 310, and the second terminal of inductor 312 is coupled to power converter 110.

More specifically, the second terminal of inductor 312 is coupled to the drain terminal of transistor 314, the drain terminal of transistor 316, the source terminal of transistor 318, and the source terminal of transistor 320. The source terminal of transistor 314 is coupled to ground node 363, and the source terminal of transistor 316 is coupled to ground node 364. The drain terminal of transistor 318 is coupled to POR 322, bandgap circuit 324, BOD 326, and LDO 332 at node 328. The drain terminal of transistor 320 is coupled to BOD 336 and LDO 340 at node 334.

Capacitor 330, having a first terminal and a second terminal, is also coupled at node 328 at the first terminal of capacitor 330. The second terminal of capacitor 330 is coupled to ground node 365. Capacitor 338, having a first terminal and a second terminal, is coupled at node 334 at the first terminal of capacitor 330. The second terminal of capacitor 338 is coupled to ground node 366. POR 322 is coupled to bandgap circuit 324, bandgap circuit 324 is coupled to BOD 326, and BOD 326 is coupled to both LDO 332 and BOD 336. BOD 336 is also coupled to logic gate 349, which is coupled to LDO 348, and to LDO 340. An output of LDO 340 is coupled to node 342. Capacitor 346, having a first terminal and a second terminal, is also coupled at node 342 at the first terminal of capacitor 346. The second terminal of capacitor 346 is coupled to ground node 367. BOD 350 and power converter controller 125 are both coupled at node 342, and BOD 350 is further coupled to an input of power converter controller 125. An input of LDO 348 is coupled to battery 105 at node 310, and another input of LDO 348 is coupled to logic gate 349. An output of LDO 348 is coupled at node 342. POR 358 is coupled to an input of boost power-up controller 360 and to an input of logic gate 349, and outputs of boost power-up controller 360 are coupled to inputs of driver 352. Outputs of power converter controller 125 are also coupled to inputs of driver 352. The outputs of driver 352 are coupled to the gate terminals of transistors 314, 316, 318, and 320 of power converter 115.

In this topology, as transistor 318 outputs the first voltage (e.g., VDDS) at node 328, capacitor 330 may be charged based on the first voltage. Similarly, as transistor 320 outputs the second voltage (e.g., VDDR) at node 334, capacitor 338 may be charged based on the second voltage. As LDO 340 outputs the third voltage (e.g., VDDD) at node 342, capacitor 346 may be charged based on the third voltage.

In various examples, different devices may be coupled to nodes 328, 334, and 342 to obtain the first, second, and third voltages, respectively. When a device coupled to one of nodes 328, 334, or 342 performs a function (e.g., a transmit operation), a respective capacitor may be drained, and thus, the voltage at a corresponding node may be reduced. Power converter controller 125 may be configured to identify when the voltages at each of the nodes, including battery voltage 106 at node 310 (referring to FIG. 3A), fall below threshold voltages or exceed threshold voltages, and may adjust operations of power converter 115 to output voltages to nodes 328 or 334 or both for certain durations. Accordingly, in the embodiment of FIG. 3A, power converter controller 125 may be configured to detect battery voltage 106 of battery 105 (at node 310) and control the mode of operation of power converter 115 based on battery voltage 106 detected at node 310.

Referring next to integrated circuit 302 of FIG. 3B, integrated circuit 302 includes similar components as integrated circuit 301 but arranged in a different configuration based on battery 105. More specifically, in this configuration, battery 105 may be coupled to provide battery voltage 106 (e.g., VDDS) to PMU 110 at node 328, and capacitor 338 may be coupled to charge inductor 312. In this configuration, battery 105 may support higher voltages than in the configuration illustrated in FIG. 3A. For example, in some embodiments, the configuration in FIG. 3A could support batteries with a voltage lower than 3 V, such as 1.5 V or 1.2 V, the configuration in FIG. 3B can support battery voltages such as 3.0 V or higher.

Referring to FIG. 3B, in operation, power converter 115 may be configured to operate in a buck mode (e.g., by operating transistors 314, 316, and 320 and disabling transistor 318) to provide a voltage (e.g., VDDR) at node 334 during a start-up phase to reduce battery voltage 106 (e.g., VDDS) to a lower voltage to power elements of PMU 110 described above. More specifically, in this configuration, power converter controller 125 may be configured to disable and enable transistors 314 and 316 of power converter 115 together to function as a pull-down switch and enable and disable transistor 320 to function as a pull-up switch based on battery voltage 106. In this way, power converter 115 may be operated like a single-phase buck converter.

In some embodiments, power converter 115 disables one of transistors 314 or 316 during buck mode operation.

Upon receiving power from power converter 115, the elements of PMU 110 function as described above to control further operations of power converter 115 during a run-time phase of integrated circuit 302. However, in this configuration, LDO 348 may be disabled based on boost-converter related circuitry (e.g., POR 358, power-up controller 360) being disabled as node 310 is coupled to ground node 362. In this way, POR enable signal 372 may include a logical low value (0), and thus, logic gate 349 may provide a logical low value to LDO 348 to disable regulation of the third voltage (e.g., VDDD) at node 342 during operation in this configuration.

Referring to the topology of integrated circuit 302 in particular, integrated circuit 302 shows a second topology of the aforementioned elements where battery 105 is, e.g., a 3.0 V battery. In this second topology, battery 105 may be configured to couple to node 328. More specifically, a first terminal of battery 105 may be coupled to node 328, and a second terminal of battery 105 may be coupled to ground node 365. Inductor 312 may instead be coupled to node 334 and to capacitor 338. LDO 348, POR 358, and power-up controller 360 may be coupled to ground node 362 at node 310.

Figure 4:
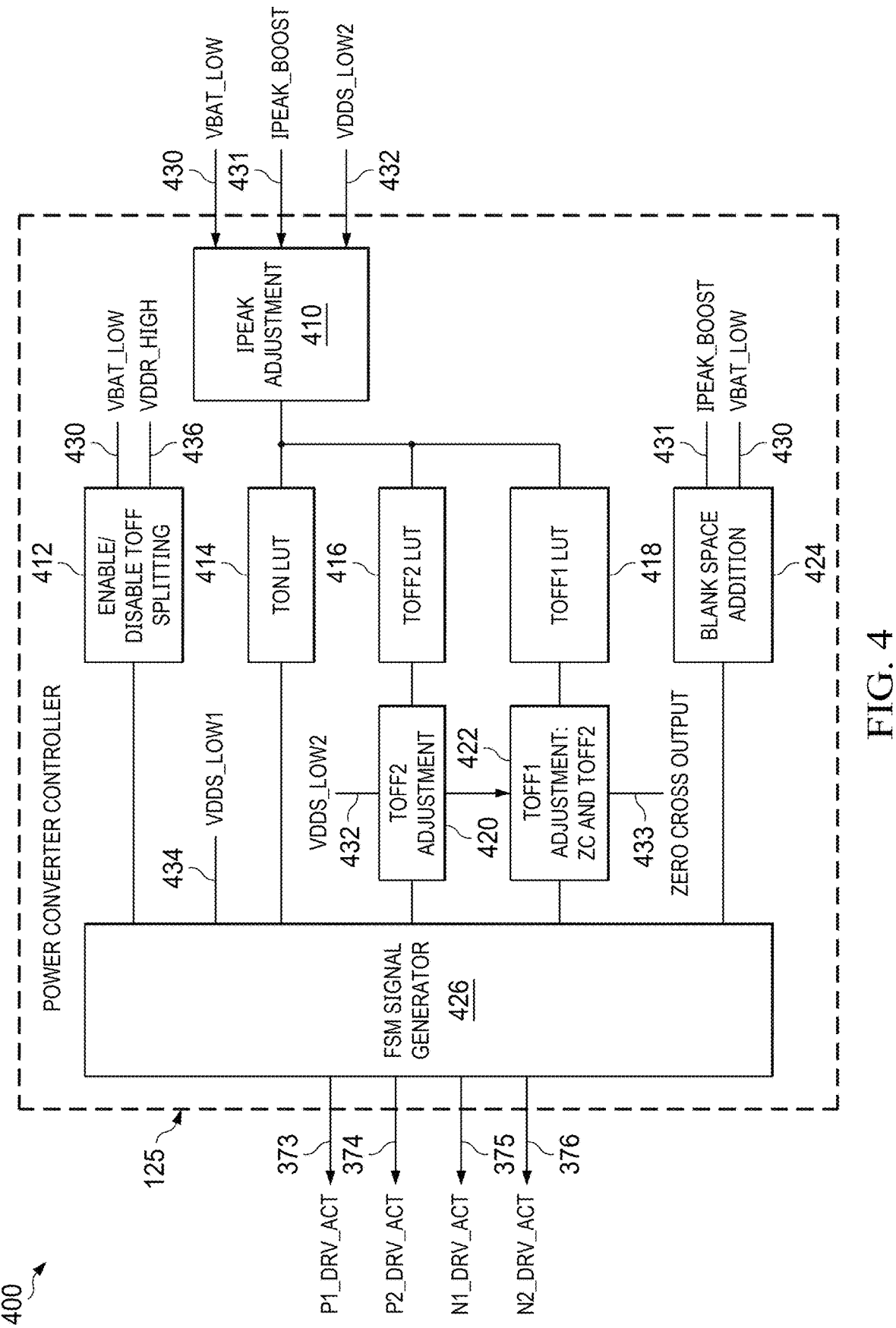
FIG. 4 illustrates an example block diagram of elements of a power converter controller, in accordance with an embodiment.

FIG. 4 illustrates an example block diagram of elements of a power converter controller in an implementation. FIG. 4 shows block diagram 400 that includes power converter controller 125 and elements thereof. For example, power converter controller 125 includes current adjustment circuit 410, time splitting circuit 412, look-up table (LUT) 414, LUT 416, LUT 418, time adjustment circuit 420, time adjustment circuit 422, blank space addition circuit 424, and finite state machine (FSM) 426.

In various examples, power converter controller 125 may be configured to receive various signals indicative of voltage values at nodes of a power management unit (PMU) (e.g., PMU 110) of an integrated circuit or system (e.g., integrated circuit 301, integrated circuit 302) (e.g., voltage indication signals 365, digital control signals 367). Examples of the signals may include battery voltage signal 430 (e.g., an indication of battery voltage 106 at node 310 or battery voltage 106 at node 328 compared to a first reference voltage), peak current signal 431 (e.g., a digital value indicative of a peak current output by power converter 115, e.g., digital control signals 367), first voltage signal 432 (e.g., a first indication of voltage at node 328 (VDDS) compared to a second reference voltage), zero-cross signal 433 (e.g., a zero-cross voltage between the voltage of inductor 312 and the voltage at node 328 (VDDS)), first voltage signal 434 (e.g., a second indication voltage at node 328 (VDDS) compared to a third reference voltage), and second voltage signal 436 (e.g., an indication of voltage at node 334 (VDDR) compared to a fourth reference voltage). Each of the voltage-related signals may include a value, such as a logical state value (e.g., a "0" or "1"), that indicates a status of a respective voltage (e.g., high, low), while peak current signal 431 may include a digital value indicative of a desired peak current of power converter 115.

Power converter controller 125 may include current adjustment circuit 410, time splitting circuit 412, LUT 414, LUT 416, LUT 418, time adjustment circuit 420, time adjustment circuit 422, blank space addition circuit 424, and FSM 426, which may be configured to receive one or more of the aforementioned signals. More specifically, current adjustment circuit 410 may be configured to receive battery voltage signal 430, peak current signal 431, and first voltage signal 432. Time splitting circuit 412 may be configured to receive battery voltage signal 430 and second voltage signal 436. Time adjustment circuit 420 may be configured to receive first voltage signal 435. Time adjustment circuit 422 may be configured to receive zero-cross signal 433. Blank space addition circuit 424 may be configured to receive battery voltage signal 430 and peak current signal 431. FSM 426 may be configured to receive first voltage signal 434 and outputs from time splitting circuit 412, LUT 414, time adjustment circuits 420 and 422, and blank space addition circuit 424.

In operation, current adjustment circuit 410 may be configured to compare battery voltage signal 430, peak current signal 431, and first voltage signal 432 to respective threshold values. Based on the results of the comparisons, current adjustment circuit 410 may reduce or increase the peak and/or average load current drawn from battery 105 (e.g., current flowing through inductor 312) via control of the operations of a power converter (e.g., by changing a value of peak current signal 431). Current adjustment circuit 410 can provide signals to LUTs 414, 416, and 418 based on the results of the comparisons.

LUTs 414, 416, and 418 may be configured to receive an output signal from current adjustment circuit 410 and output time durations and/or time intervals based on the received signals from current adjustment circuit 410. In various examples, LUTs 414, 416, and 418 may include one or more data structures or devices capable of storing data corresponding to on and off durations for operation of the power converter. Specifically, LUT 414 may include data indicative of a plurality of durations corresponding to an "on" time (also referred to as "$T_{ON}$") whereby the power operates in a way to charge an inductor coupled to the power converter (e.g., transistors 318 and 320 are off). LUT 418 may include data indicative of a plurality of durations corresponding to a first "off" time (also referred to as "$T_{OFF1}$") whereby power converter operates in a SIMO mode to produce the first output voltage during a first time interval of an identified duration. LUT 416 may include data indicative of a plurality of durations corresponding to a second "off" time (also referred to as "$T_{OFF2}$") whereby the power converter operates in a SIMO mode to produce the first output voltage during a second time interval of an identified duration. LUT 414 may be coupled to provide $T_{ON}$ to FSM 426, LUT 416 may be coupled to provide $T_{OFF2}$ to time adjustment circuit 420, and LUT 418 may be coupled to provide $T_{OFF1}$ to time adjustment circuit 422.

Time adjustment circuit 420 may be further coupled to receive first voltage signal 435, compare first voltage signal 435 with $T_{OFF2}$, and adjust $T_{OFF2}$ based on first voltage signal 435. Similarly, time adjustment circuit 422 may be further coupled to receive zero-cross signal 433, compare zero-cross signal 433 with $T_{OFF1}$, and adjust $T_{OFF1}$ based on zero-cross signal 433. Time adjustment circuits 420 and 422 can provide adjusted time durations or intervals to FSM 426.

Blank space addition circuit 424 may be configured to receive battery voltage signal 430 and peak current signal 431 and provide a blank space duration (also referred to as blanking time) to FSM 426 based on battery voltage signal 430 and peak current signal 431. For example, if blank space addition circuit 424 determines that battery voltage signal 430 falls below a threshold voltage, blank space addition circuit 424 may provide a longer blank space duration to FSM 426 relative to if battery voltage 430 meets or exceeds the threshold voltage. The blank space duration may refer to a time interval following $T_{OFF1}$ whereby the power converter may remain off or disabled to reduce current drawn from the battery. Similarly, blank space addition circuit 424 may determine the blank space duration based on whether peak current signal 431 falls below or exceeds a threshold current value.

FSM 426 may be configured to receive all of the inputs and generate control signals 373, 374, 375, and 376 based on the inputs supplied to FSM 426. FSM 426 may be coupled to provide the control signals to a driver (e.g., driver 352), which may be configured to supply signals based on the control signals to gate terminals of transistors of the power converter to control operations thereof.

Figure 5:
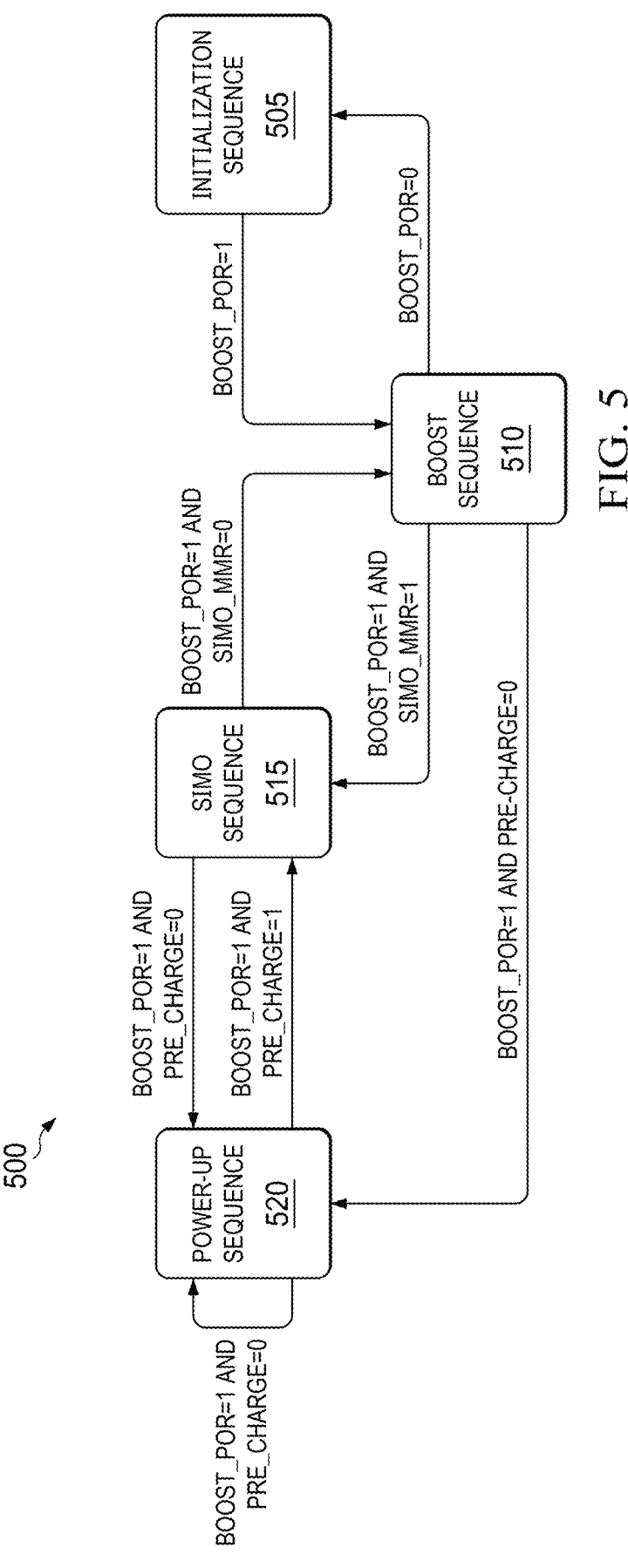
FIG. 5 illustrates an example sequence diagram of operating a power converter, in accordance with an embodiment.

FIG. 5 illustrates an example sequence diagram of operating a power converter in an implementation. FIG. 5 shows sequence 500, which references elements of FIGS. 3A and 3B. In various examples, sequence 500 may include a series of logical sequences that power converter controller 125, or a finite state machine thereof (e.g., FSM 426), may perform to control operations of power converter 115. In some embodiments, sequence 500 may be performed to operate power converter 115 in a boost mode or a SIMO mode when a system is configured in a boost topology (e.g., integrated circuit 301). In some embodiments, sequence 500 may be performed to operate power converter 115 in a buck mode. In that way, in some embodiments, the same sequence 500 can be used irrespective of the circuit configuration (e.g., 301 or 302).

During an initialization sequence 505, power converter controller 125 may be configured to determine whether components of PMU 110 have been initialized at operational voltage levels. During this sequence, power converter controller 125 may be configured to identify a value produced by POR 358, among other components, and if the value output by POR 358 is low, or "0", power converter controller 125 might not control operations of power converter 115. However, if the value output by POR 358 is high, or "1", power converter controller 125 can perform boost sequence 510.

During boost sequence 510, power converter controller 125 may be configured to operate power converter 115 in one of two boost converter modes. For example, power converter 115 can operate in a boost mode to enable precharging of a system, such as when battery voltage 106 falls below a threshold level, or power converter 115 can operate in a SIMO mode to enable operations of the system using multiple outputs following a pre-charging sequence. Power converter controller 125 may be configured to identify a value of a pre-charge output (e.g., pre-charge signal 1207 of FIG. 12) during boost sequence 510. If the value of the pre-charge output is low, or "0", power converter controller 125 may be configured to enable power-up controller 360 and perform power-up sequence 520. While the pre-charge output remains low, power-up controller 360 can produce control signals 377 and 378 to enable the pre-charge, boost mode of power converter 115. In the boost mode, power converter 115 may be configured to output a single voltage, such as a voltage at node 328. During the power-up sequence 520, if the pre-charge output is high, or "1", power converter controller 125 may be configured to produce control signals 377 and 378 to enable power converter 115 operate in the SIMO mode.

When both the output of POR 358 and the pre-charge output are high, or when the output of POR 358 and a SIMO enable output are high, power converter controller 125 may be configured to perform SIMO sequence 515 and enable power converter 115 to operate in the SIMO mode. If, during SIMO sequence 515, either the pre-charge output or the SIMO enable output are low, power converter controller 125 can perform power-up sequence 520 or boost sequence 510, respectively. During SIMO sequence 515, power converter 115 may be configured to produce voltages at nodes 328 and 334.

Figure 6:
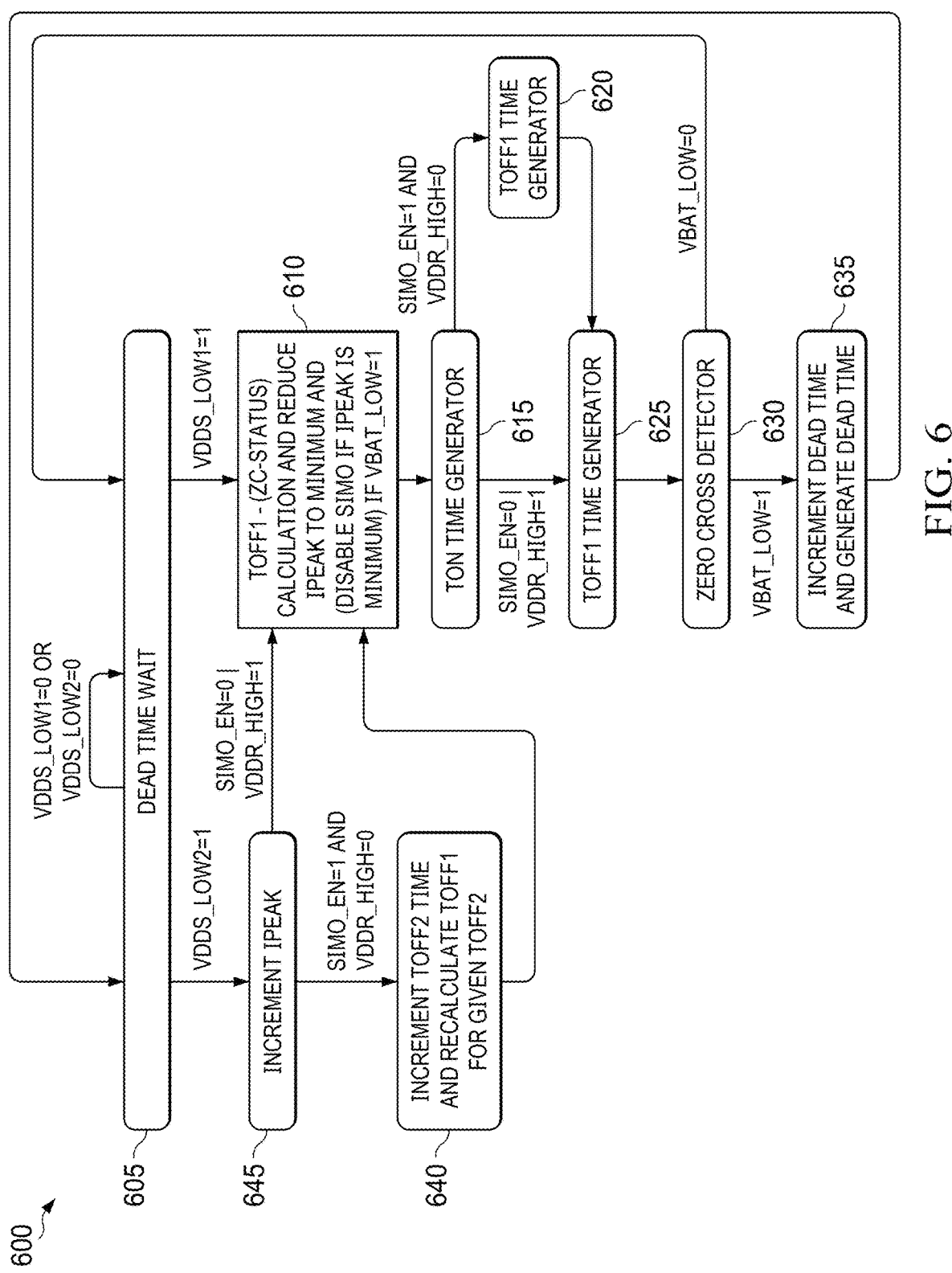

FIG. 6 illustrates an example sequence diagram of operating a power converter in an implementation. FIG. 6 shows sequence 600, which references elements of FIGS. 3A and 4. In various examples, sequence 600 relates to logical sequences performed by a finite state machine (e.g., FSM 426) of a power converter controller (e.g., power converter controller 125) during operation of a power converter (e.g., power converter 115) in a SIMO mode, such as during a SIMO sequence (e.g., SIMO sequence 515).

In sequence 605, power converter controller 125 identifies values corresponding to first voltage signal 432 (e.g., VDDS) and first voltage signal 434 (e.g., VDDS) and corresponding to two respective threshold voltages relative to first voltage signal 432 and first voltage signal 434. If either of the values are low, or below a threshold voltage, power converter controller 125 may be configured to increase a duration that power converter 115 is off or disabled, such that power converter controller 125 does not output voltages at either node 328 or 334. This duration may be referred to as blank space or dead time.

Next, in sequence 610, power converter controller 125 identifies that the value corresponding to first voltage signal 434 is high, or meets or exceeds a threshold voltage. In response to determining that first voltage signal 434 is high, power converter controller 125 determines a duration value for a first time interval ($T_{OFF1}$) and determines a value for a peak current (e.g., the peak current produced by power converter 115) (e.g., peak current signal 431). The first time interval may refer to a time when power converter 115 outputs the first voltage at node 328 (VDDS). In some examples, power converter controller 125 may increase the duration of the first time interval. In some examples, power converter controller 125 may decrease the duration of the first time interval. The peak current may refer to a maximum current or an average current produced by power converter 115. In sequence 610, power converter controller 125 may identify a value corresponding to a voltage from battery 105 (e.g., the voltage at node 310). If the value of the battery voltage meets or exceeds a threshold voltage, power converter controller 125 may enable power converter 115 to produce the peak current at a minimum current.

In sequence 615, power converter controller 125 identifies a duration value for another time interval ($T_{ON}$) during which power converter 115 charges inductor 312 and does not produce output voltages at either node 328 or node 334. Power converter controller 125 may perform sequence 620 or sequence 625 based on values of a SIMO enable output and second voltage signal 436 (e.g., VDDR). If the power converter 115 is configured to operate in a SIMO mode (e.g., SIMO enable output is high), and second voltage signal 436 is low, or below a threshold voltage, power converter controller 125 may be configured to generate a duration value for the first time interval ($T_{OFF1}$) based on the duration value for the time interval determined in sequence 615. However, if the power converter 115 is configured to operate in a boost mode (e.g., SIMO enable output is low), and second voltage signal 436 is high, or at or above a threshold voltage, power converter controller 125 may be configured to generate a different duration value for the first time interval ($T_{OFF1}$) in sequence 625.

Next, in sequence 630, power converter controller 125 may be configured to detect a zero-cross value corresponding to a voltage of a switch, or inductor (e.g., inductor 312), coupled to power converter 115 and the first voltage at node 328 (VDDS) following the time interval after power converter 115 charges inductor 312 (i.e., $T_{ON}$). During sequence 630, if the battery voltage 106, or battery voltage signal 430, indicates a low value, power converter controller 125 may be configured to repeat sequence 600 from sequence 605. If battery voltage signal 430 indicates a high value, power converter controller 125 may be configured to perform sequence 635 whereby power converter controller 125 increments the blank space and generates another duration value for the blank space prior to performing sequence 605 and repeating sequence 600.

Upon repeating sequence 600 or upon beginning sequence 600, power converter controller converter 125 may be configured to perform sequence 645 after waiting the blank space duration in sequence 605 based on first voltage signal 432 being high, or being at or above a threshold voltage. In sequence 645, power converter controller 125 may be configured to increase the peak current to a higher value relative to the minimum peak current. If the SIMO enable output is high and second voltage signal 436 is low, power converter controller 125 may be configured to perform sequence 640 whereby power converter controller increases a duration value of a second time interval ($T_{OFF2}$) during which power converter 115 produces the second voltage output at node 344. Accordingly, based on increasing the duration of the second time interval, power converter controller 125 may further be configured to increase the duration of the first time interval ($T_{OFF1}$) based on the change in duration value of the second time interval. Following sequence 640, power converter controller 125 may proceed to perform sequence 610. If, however, the SIMO enable output is low and second voltage signal 436 is high, power converter controller 125 might not perform sequence 640 and may perform sequence 610.

Figure 7:
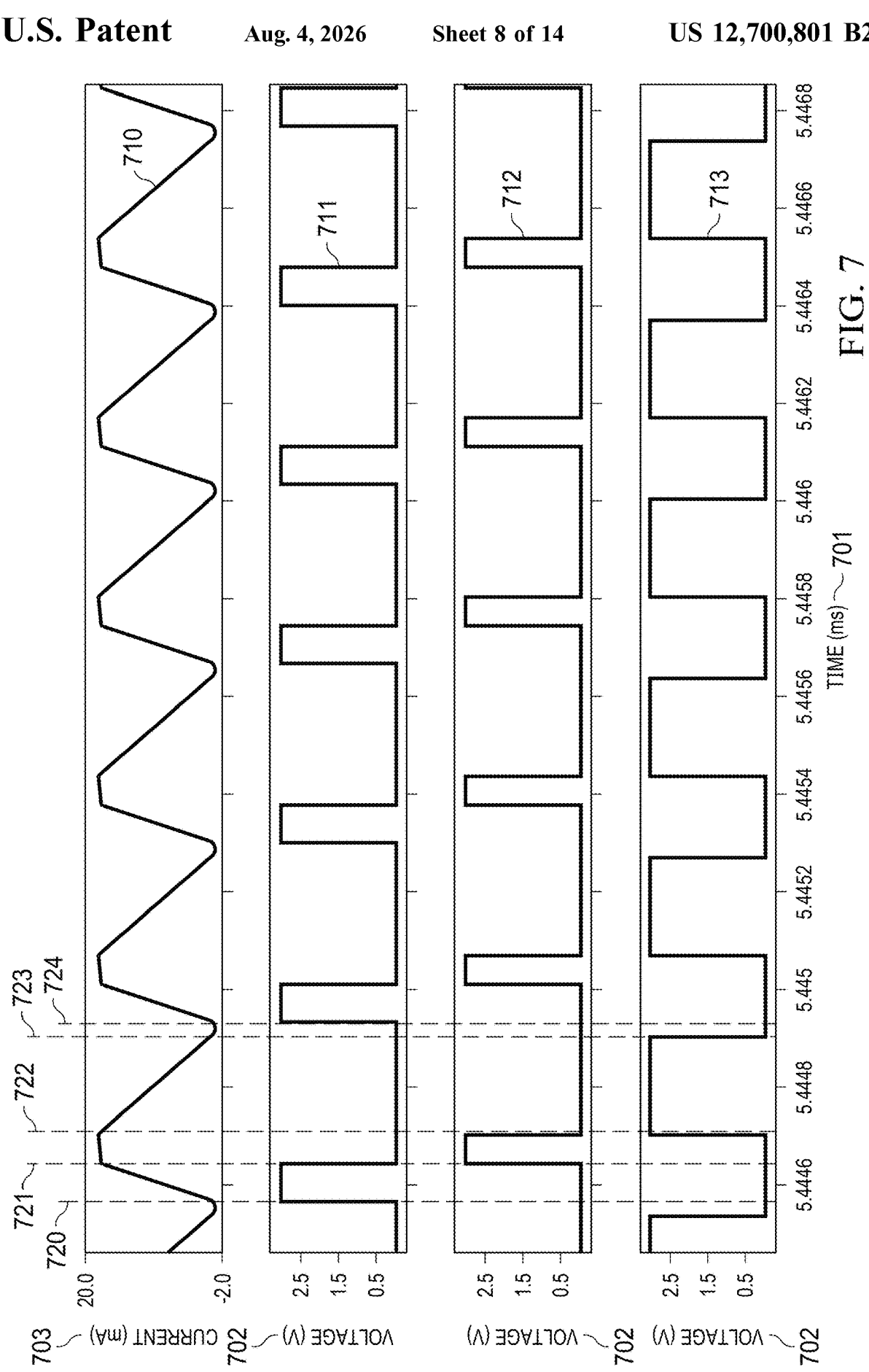
FIGS. 7, 8, 9, 10, and 11 illustrate example graphical representations of signals produced within an integrated circuit, in accordance with an embodiment.
Figure 8:
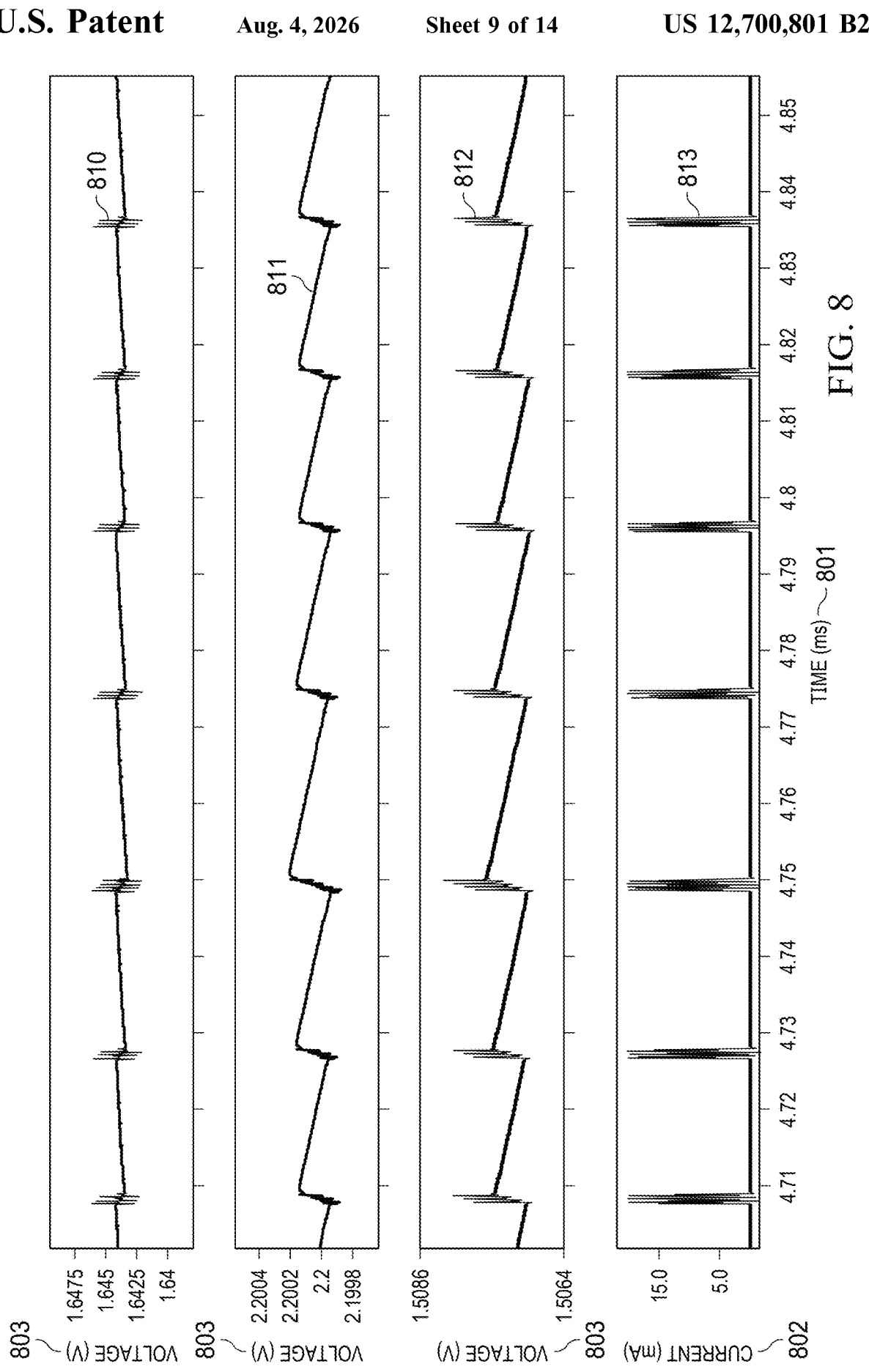
Figure 9:
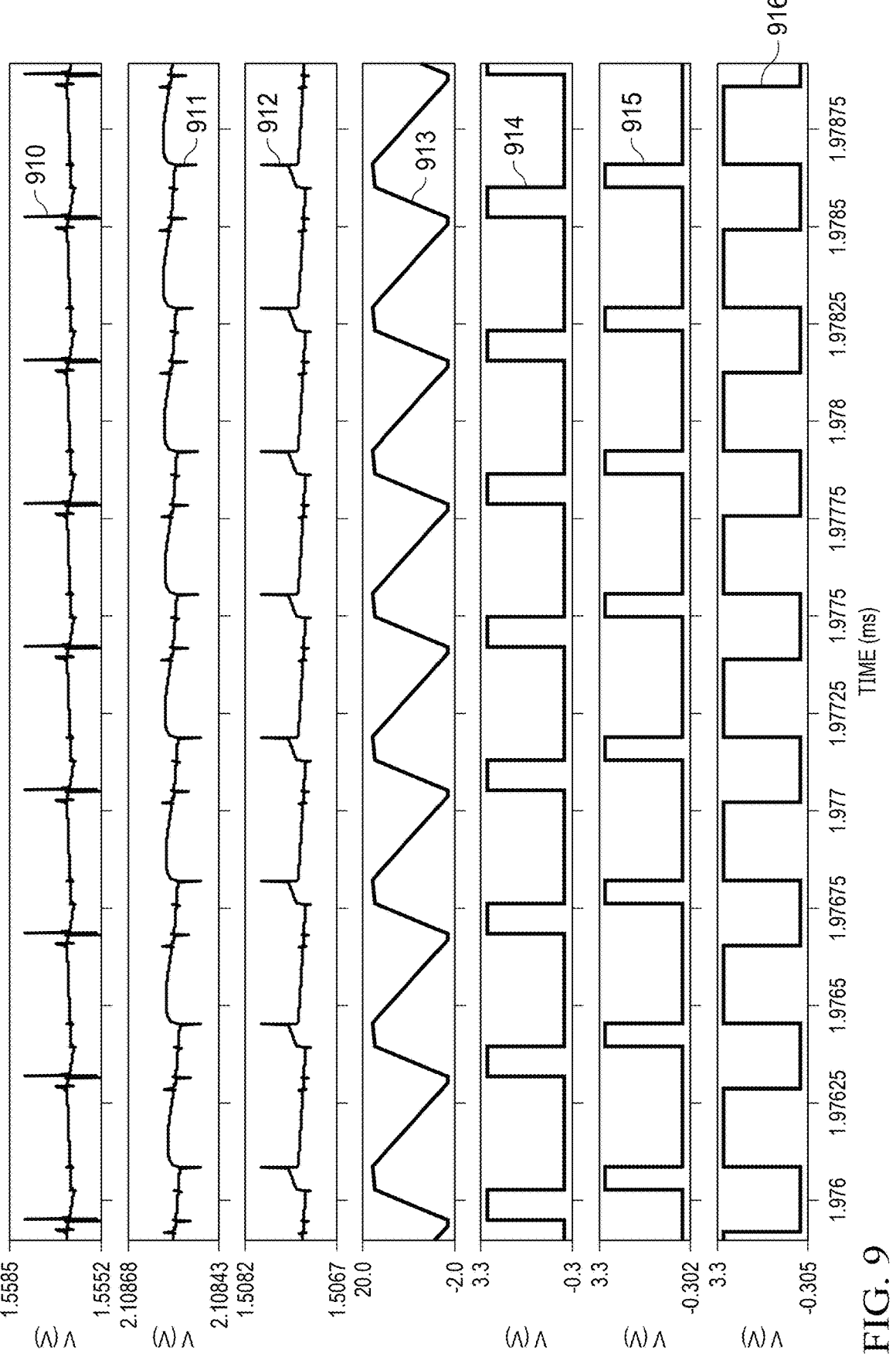
Figure 10:
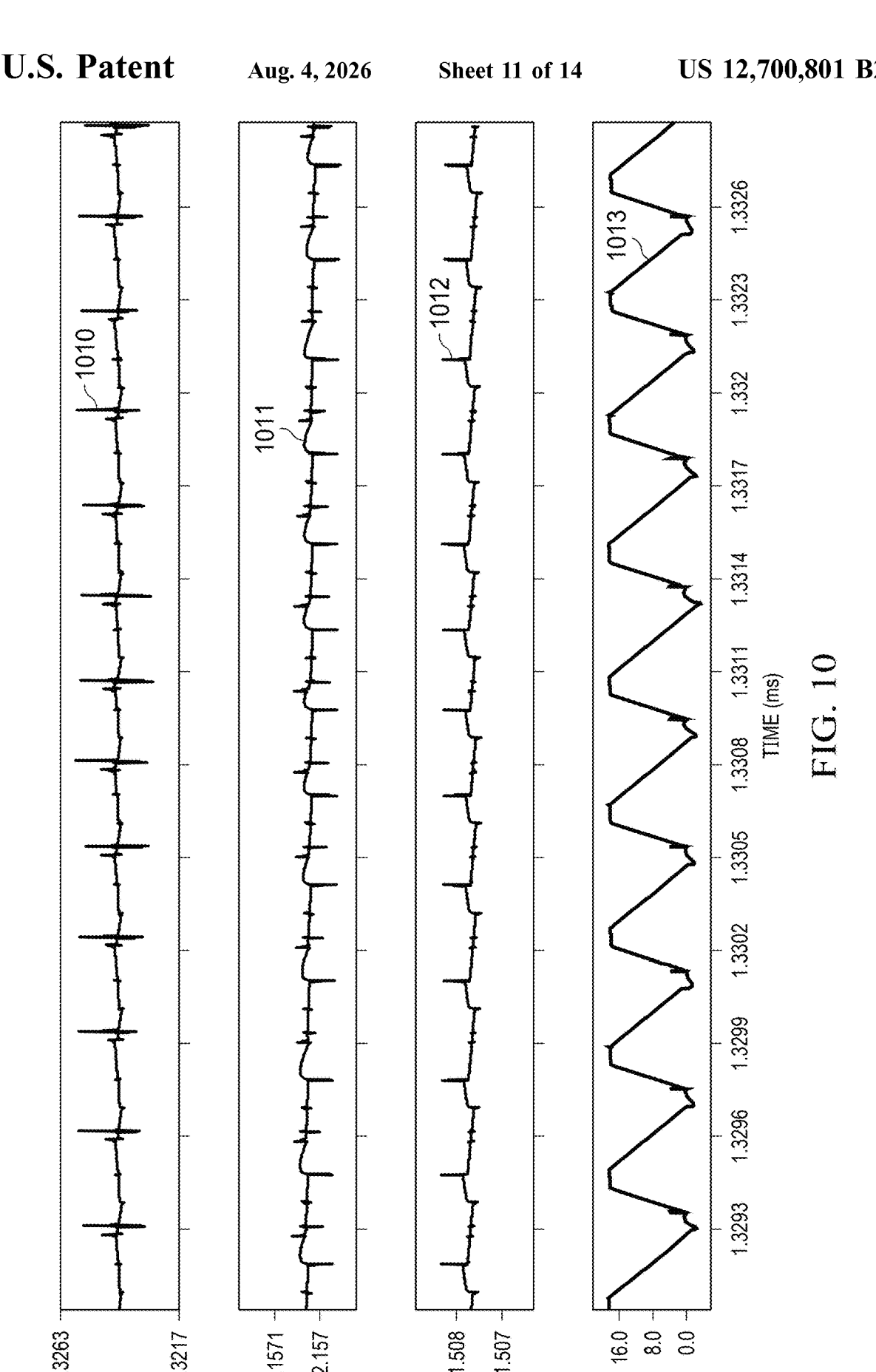
Figure 11:
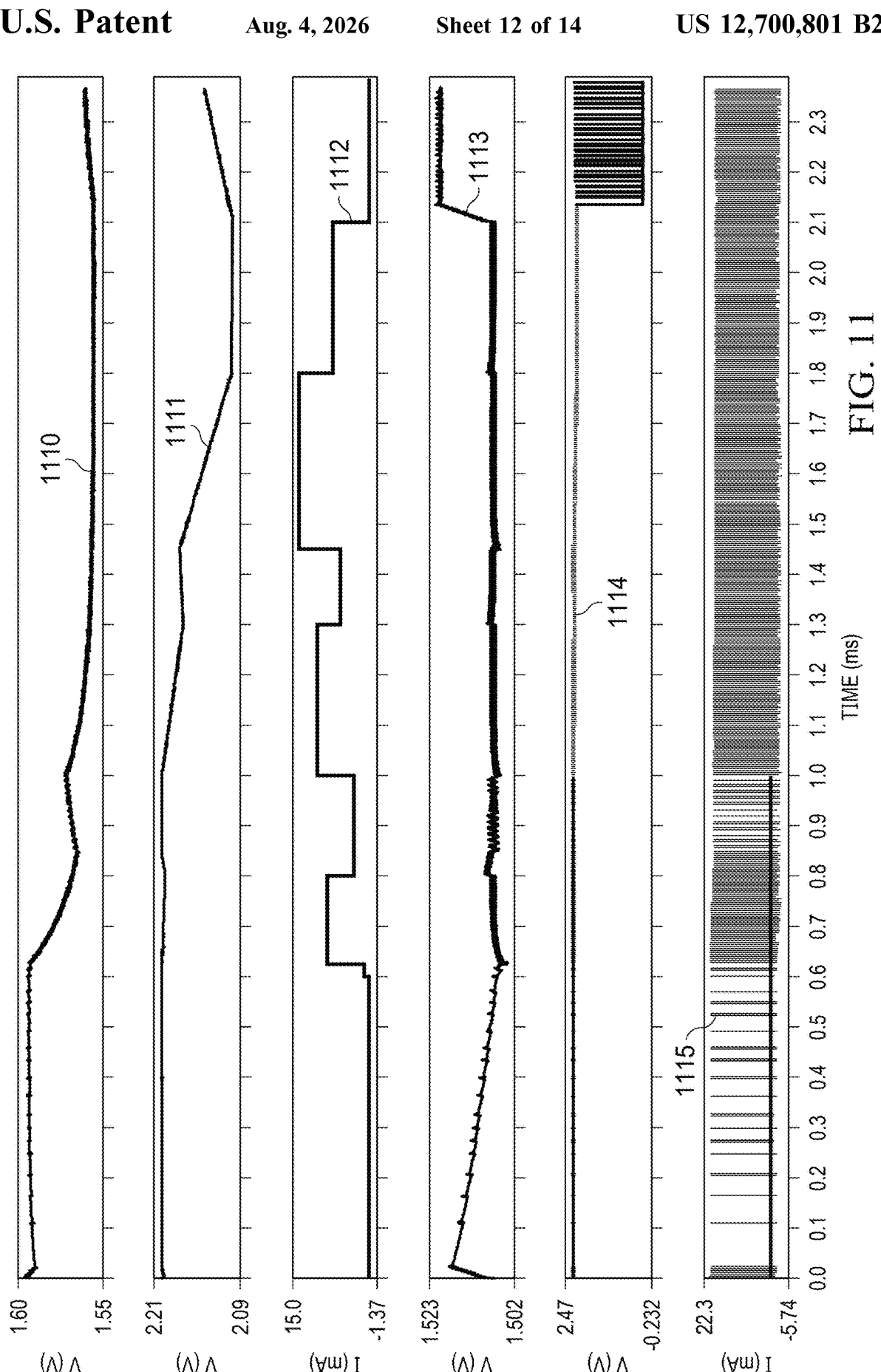

FIGS. 7, 8, 9, 10, and 11 illustrate example graphical representations of signals produced within an integrated circuit in an implementation. FIG. 7 shows graphical representations including waveforms 710, 711, 712, and 713. FIG. 8 shows graphical representations including waveforms 810, 811, 812, and 813. FIG. 9 shows graphical representations including waveforms 910, 911, 912, 913, 914, 915, and 916. FIG. 10 shows graphical representations including waveforms 1010, 1011, 1012, and 1013. FIG. 11 shows graphical representations including waveforms 1110, 1111, 1112, 1113, 1114, and 1115. The aforementioned Figures reference elements of integrated circuit 301 of FIG. 3A.

Referring first to FIG. 7, waveform 710 may include values corresponding to current 703 with respect to time 701 and waveforms 711, 712, and 713 may include values corresponding to voltage 702 with respect to time 701, which demonstrate outputs of components of integrated circuit 301 of FIG. 3A during operation in boost and SIMO modes. Waveform 710 may correspond to a current of inductor 312 coupled to battery 105 and to power converter 115 as in the configuration shown in FIG. 3A. Waveform 711 may correspond to a voltage applied to inductor 312 to charge the inductor 312 during a first time interval. This first time interval may be referred to as $T_{ON}$. Waveform 712 may correspond to a voltage produced and output by power converter 115 during a second time interval while the power converter 115 is operating in a SIMO mode. This second time interval may be referred to as $T_{OFF2}$. Waveform 713 may correspond to a voltage produced and output by a power converter 115 during a third time interval while the power converter 115 is operating in the SIMO mode. This third time interval may be referred to as $T_{OFF1}$.

At time 720, waveform 711 may transition from a logical low state ("0") to a logical high state ("1") and stay in the logical high state for a duration between time 720 and time 721 (e.g., the first time interval, or $T_{ON}$). When waveform 711 transitions to the logical high state, a power converter 115 may charge inductor 312 and might not output voltage to other nodes of integrated circuit 301 (e.g., node 328, node 334). Accordingly, current 703 may increase from a first value to a second value during this first time interval as shown by waveform 710. Further, waveforms 712 and 713 may remain in the logical low state during the first time interval, such that voltage 702 output at a second node (e.g., node 334) and a first node (e.g., node 328), respectively, might have a value of 0 V.

Next, at time 721, waveform 711 may transition from the logical high state to the low logical state, and waveform 712 may transition from the logical low state to the logical high state and stay in the logical high state for a duration between time 721 and time 722 (i.e., the second time interval, or $T_{OFF2}$). When waveform 712 transitions to the logical high state, the power converter 115 may be configured to output a voltage (VDDR) having a non-zero value with respect to voltage 702 at node 334. During the second time interval, waveform 710 may slightly increase, slightly decrease, or remain nearly constant with respect to current 703.

At time 722, waveform 712 may transition from the logical high state to the logical low state, and waveform 713 may transition from the logical low state to the logical high state and stay in the logical high state for a duration between time 722 and 723 (i.e., the third time interval, or $T_{OFF1}$). When waveform 713 transitions to the logical high state, the power converter 115 may be configured to output a voltage (VDDS) having a non-zero value with respect to voltage 702, at a different node of a system, node 328. During the third time interval, waveform 710 may decrease with respect to current 703 as current from the inductor 312 may be used by the power converter 115 to output the voltage (VDDS) at node 328.

At time 723, waveforms 711, 712, and 713 may all be in the logical low state, such that the power converter 115 is disabled or does not produce voltage to charge the inductor, provide an output voltage at node 328, or provide an output voltage at node 334. The power converter may remain off for a blank space, or dead time, duration between time 723 and 724. Power converter controller 125 may control the amount of time of the blank space duration based on the values of current 703 and voltage 702 produced by the power converter 115 and/or produced by battery 105.

In various examples, the durations of each time interval may vary depending on inputs and outputs of elements of a system relative to respective threshold values. Accordingly, a power converter controller capable of controlling operations of a power converter that can produce voltages for time intervals as indicated by waveforms 711, 712, and 713, may be configured to increase or decrease the durations dynamically during operation of the power converter. For example, the graphical representations shown in FIG. 9 demonstrate other durations of time intervals for turning on/off elements of the power converter to produce different voltages at different nodes of a system.

The graphical representations shown in FIGS. 8, 9, 10, and 11 demonstrate current and voltage values measured at nodes of integrated circuit 301 during operation thereof.

Figure 12:
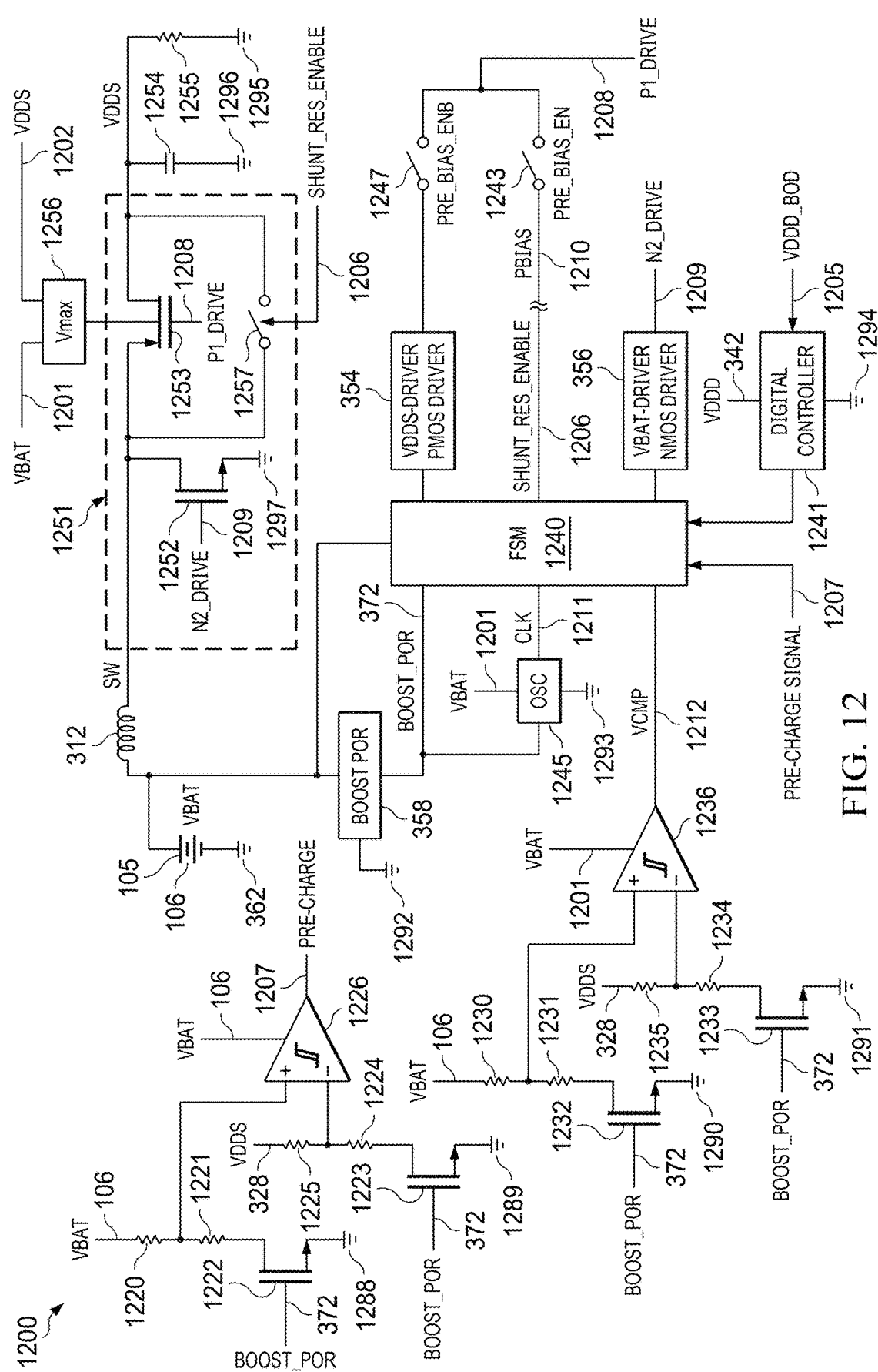
FIG. 12 illustrates an example block diagram of elements of an integrated circuit, in accordance with an embodiment.

FIG. 12 illustrates an example block diagram of elements of an integrated circuit in an implementation. FIG. 12 shows block diagram 1200, which includes and references elements of FIGS. 1, 3A, and 3B, such as battery 105, comparator 1226, comparator 1236, finite state machine (FSM) 1240, digital controller 1241, driver 354, driver 356, oscillator 1245, power-on-reset (POR) 358, power converter 1251, and various resistors, inductors, capacitors, transistors, and other electrical components. Components of block diagram 1200 may be included in a power management system, such as PMU 110 of FIG. 1, integrated circuit 301 of FIG. 3A, and/or integrated circuit 302 of FIG. 3B. More specifically, in some embodiments, block diagram 1200 may be representative of power-up controller 360, and a topology thereof, of integrated circuits 301 and 302.

In various examples, the components of block diagram 1200 may be configured to perform pre-charging techniques to enable power converter 1251 to operate in a boost mode to regulate one or more voltages (e.g., VDDD at node 342) of an integrated circuit (e.g., integrated circuit 301). When enabled, power converter 1251 may be configured to output voltage at an output node of power converter 1251 (VDDS). In some embodiments, power converter 1251 may be representative of power converter 115, or a configuration thereof. In various embodiments, the components of block diagram 1200 may be enabled to operate as described herein in a configuration when a battery voltage (e.g., battery voltage 106) falls below a threshold voltage and boost modes of power converter 1251 may be used to regulate one or more voltages of an integrated circuit (e.g., integrated circuit 301).

In some embodiments, controller 360 may include FSM 1240, digital controller 1241, and comparators 1226 and 1236. In some embodiments, controller 360 may also include transistors 1232, 1233, 1223, 1222, resistors 1220, 1221, 1225, 1224, 1230, 1231, 1234, and 1235.

Battery 105 may be configured to couple to inductor 312, POR 358, FSM 1240, ground node 362, and to other components via one or more battery pins (e.g., node 310). A first terminal of resistor 1220 may be coupled to battery 105 via a battery pin. A second terminal of resistor 1220 may be coupled to a first terminal of resistor 1221 and to a first input of comparator 1226. A second terminal of resistor 1221 may be coupled to a source terminal of transistor 1222. A gate terminal of transistor 1222 may be coupled to receive POR enable signal 372 from POR 358, and a drain terminal of transistor 1222 may be coupled to ground node 1288. A first terminal of resistor 1225 may be coupled to an output of power converter 1251 to receive a first output voltage (VDDS) 328. A second terminal of resistor 1225 may be coupled to a first terminal of resistor 1224 and to a second input of comparator 1226. A second terminal of resistor 1224 may be coupled to a source terminal of transistor 1223, which may include a gate terminal coupled to receive POR enable signal 372 from POR 358 and a drain terminal coupled to ground node 1289. Comparator 1226 may include a third input coupled to battery 105 via a battery pin (e.g., node 310). Comparator 1226 may be configured to compare the received inputs and output pre-charge signal 1207.

Similarly, a first terminal of resistor 1230 may be coupled to battery 105 via a battery pin. A second terminal of resistor 1230 may be coupled to a first terminal of resistor 1231 and to a first input of comparator 1236. A second terminal of resistor 1231 may be coupled to a source terminal of transistor 1232. A gate terminal of transistor 1232 may be coupled to receive POR enable signal 372 from POR 358, and a drain terminal of transistor 1232 may be coupled to ground node 1290. A first terminal of resistor 1235 may be coupled to an output of power converter 1251 to receive the first output voltage (VDDS) 328. A second terminal of resistor 1235 may be coupled to a first terminal of resistor 1234 and to a second input of comparator 1236. A second terminal of resistor 1234 may be coupled to a source terminal of transistor 1233, which may include a gate terminal coupled to receive POR enable signal 372 from POR 358 and a drain terminal coupled to ground node 1291. Comparator 1226 may include a third input coupled to battery 105 via the battery pin. Comparator 1236 may be configured to compare the received inputs and output a voltage comparison signal 1212 to FSM 1240.

FSM 1240 may also be coupled to receive pre-charge signal 1207 from comparator 1226, POR enable signal 372 from POR 358, clock signal 1211 from oscillator 1245, shunt resistor enable signal 1206, transistor control signal 1209 from driver 354, transistor control signal 1208 from driver 356, and control signals from digital controller 1241. POR 358 may be coupled to ground node 1292 and to oscillator 1245. Oscillator 1245 may be coupled to battery 105 via a battery pin and to ground node 1293. Oscillator 1245 may be configured to operate using the battery voltage 106 to produce clock signal 1211 and to provide clock signal 1211 to FSM 1240. Digital controller 1241 may be coupled to a brown-out detector to receive BOD enable signal 1205 (e.g., the output of BOD 350), to an output of power converter 1251 to receive a third output voltage 342 (VDDD), and to ground node 1294. Driver 354 may be coupled to a power converter controller (e.g., power converter controller 125) to receive transistor control signal 1209 from the power converter controller and provide transistor control signal 1209 to FSM 1240. Driver 356 may be coupled to the power converter controller (e.g., power converter controller 125) to receive transistor control signal 1208. Driver 356 may also be coupled to switches 1243 and 1247. Switch 1243 may be coupled to receive bias signal 1210, which may be provided to driver 356 based on states of switches 1243 and 1247.

FSM 1240 may be configured to provide one or more different signals to power converter 1251 based on inputs to FSM 1240, such as voltage comparison signal 1212, shunt resistor enable signal 1206, transistor control signals 1208 and 1209, and control signals from digital controller 1241. Power converter 1251 includes various transistors, such as transistors 1252 and 1253, configured to receive the signals from FSM 1240 and control signals from drivers 354 and 356 and to operate in different modes based on values of the received signals. Transistor 1252 includes a source terminal coupled to inductor 312, a gate terminal coupled to driver 354 to receive transistor control signal 1209, and a drain terminal coupled to ground node 1297. Transistor 1253 includes a drain terminal coupled to the source terminal of transistor 1252, a gate terminal coupled to driver 356 to receive transistor control signal 1208, and a source terminal coupled to capacitor 1254 and resistor 1255. The source terminal of 1252 and the drain terminal of transistor 1253 are also coupled to switch 1257, which is also coupled to the source terminal of transistor 1253. When in a closed state, transistors 1252 and 1253 may be coupled to receive shunt resistor enable signal 1206. Transistor 1253 may further be coupled to receive a voltage signal from voltage comparator 1256, which may be coupled to receive the battery voltage from battery 105 and to receive the first voltage signal 328 from an output of power converter 1251. Capacitor 1254 may further be coupled to ground node 1296, and resistor 1255 may further be coupled to ground node 1295.

Figure 13:
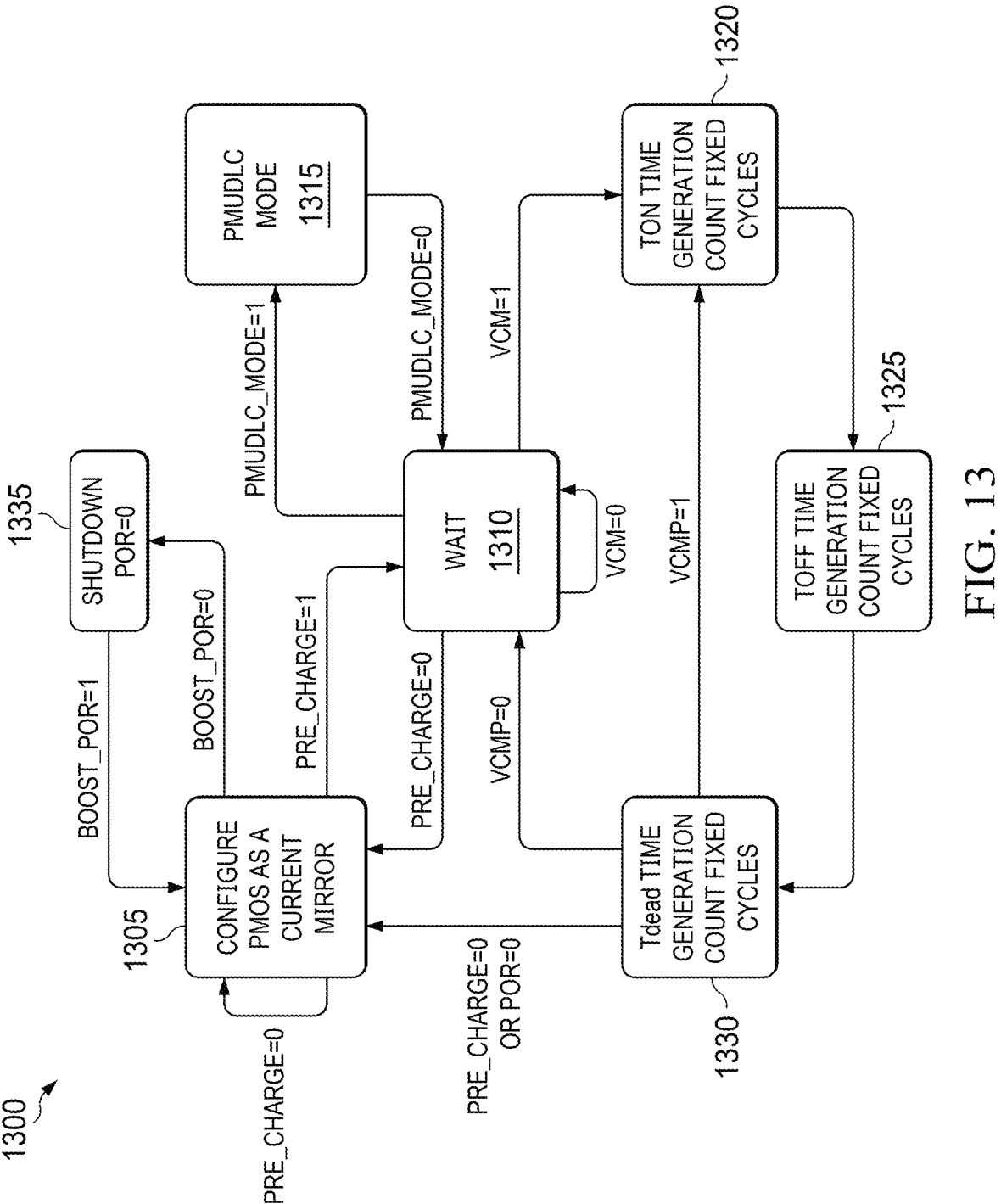
FIG. 13 illustrates an example sequence diagram of operating a power converter, in accordance with an embodiment.

FIG. 13 illustrates an example sequence diagram of operating a power converter in an implementation. FIG. 13 shows sequence 1300, which references elements of FIGS. 1, 3A, 3B, and 12. In various examples, sequence 1300 may include a series of logical sequences finite state machine (FSM) 1240 may perform to control operations of power converter 1251.

Beginning with sequence 1305, FSM 1240 may be configured to identify a value of pre-charge signal 1207. Based on FSM 1240 determining that the value of pre-charge signal 1207 is low, or "0", FSM 1240 may be configured to drive transistor 1253 to function as a current mirror via transistor control signal 1208. In sequence 1305, FSM 1240 may further be configured to identify a value of POR enable signal 372. Based on determining that the value of POR enable signal 372 is low, or "0", FSM 1240 may be configured to disable power converter 1251 such that power converter 1251 does not regulate a voltage of integrated circuit 301 in sequence 1335 unless and until FSM 1240 determines that POR enable signal 372 is high, or "1". Based on FSM 1240 determining that the value of pre-charge signal 1207 is high, or "1", FSM 1240 may be configured to perform sequence 1310.

In sequence 1310, FSM 1240 may be configured to wait a predetermined amount of time and identify values corresponding to pre-charge signal 1207, voltage comparison signal 1212, and control signals from digital controller 1241, such as a mode enable signal (denoted by PMUDLC_MODE in FIG. 13). Based on determining that the value of pre-charge signal 1207 is low, FSM 1240 may be configured to perform sequence 1305. Based on determining that the value of voltage comparison signal 1212 is low, FSM 1240 may be configured to continue performing sequence 1310. Based on determining that the value of the mode enable signal is high, FSM 1240 may be configured to perform sequence 1315 during which FSM 1240 may be configured to enable a mode of power converter 1251 and other components of the system or circuit.

In response to determining that the value of voltage comparison signal 1212 is high and the mode enable signal is low, FSM 1240 may be configured to perform sequence 1320. In sequence 1320, FSM 1240 may be configured to generate a duration for a time interval during which power converter 1251 charges inductor 312 (i.e., $T_{ON}$). Next, FSM 1240 may be configured to perform sequence 1325. In sequence 1325, FSM 1240 may be configured to generate a duration for one or more other time intervals during which power converter 1251 outputs one or more voltages based on the amount of charge of inductor 312 (i.e., $T_{OFF1}$, $T_{OFF2}$). FSM 1240 may next be configured to perform sequence 1330 whereby FSM 1240 is configured to generate a duration for a dead time, or blank space, time interval during which power converter 1251 is disabled following the previously mentioned time intervals. Further, during sequence 1330, FSM 1240 may be configured to identify values corresponding to POR enable signal 372, pre-charge signal 1207, and voltage comparison signal 1212. Based on determining that either POR enable signal 372 or pre-charge signal 1207 is low, FSM 1240 may be configured to perform sequence 1305. Based on determining that POR enable signal 372 and pre-charge signal 1207 are high and voltage comparison signal 1212 is low, FSM 1240 may be configured to perform sequence 1310. Based on determining that each of the signals is high, FSM 1240 may be configured to repeat sequences 1320, 1325, and 1330.

Example embodiments of the present disclosure are summarized here. Other embodiments can also be understood from the entirety of the specification and the claims filed herein.

Example 1. An integrated circuit, including: a first terminal configured to be coupled to a battery; second, third, and fourth terminals; a power converter including: a first transistor having a control terminal, and first and second current path terminals; a second transistor having a control terminal, and first and second current path terminals; a third transistor having a control terminal, and first and second current path terminals; and a fourth transistor having a control terminal, and first and second current path terminals; and a controller configured to control the power converter; where the second current path terminal of the first transistor is coupled to the first terminal, the second current path terminal of the second transistor, the first current path terminal of the third transistor, and the first current path terminal of the fourth transistor; where the second current path terminal of the third transistor is coupled to the second terminal of the integrated circuit; where the second current path terminal of the fourth transistor is coupled to the third terminal of the integrated circuit; and where the controller is coupled to the fourth terminal of the integrated circuit.

Example 2. The integrated circuit of example 1, further including reference voltage circuitry, a first voltage regulator, and a second voltage regulator, where: the reference voltage circuitry is coupled to the second current path terminal of the third transistor, the second terminal of the integrated circuit, and the first voltage regulator; the first voltage regulator is coupled to the second terminal of the integrated circuit, the reference voltage circuitry, and the third terminal of the integrated circuit; and the second voltage regulator is coupled to the third terminal of the integrated circuit, the fourth terminal of the integrated circuit, and the controller.

Example 3. The integrated circuit of one of examples 1 or 2, where the control terminals of the first, second, third, and fourth transistors of the power converter are coupled to receive sets of inputs from the controller, where, based on receiving a first set of inputs at the control terminals of the first, second, third, and fourth transistors, the power converter is configured to operate in a first mode, and where, based on receiving a second set of inputs at the control terminals of the first, second, third, and fourth transistors, the power converter is configured to operate in a second mode.

Example 4. The integrated circuit of one of examples 1 to 3, where the power converter is configured to receive a battery voltage from the first terminal of the integrated circuit, and where, in the first mode, the power converter is configured to output, based on the battery voltage, a first voltage at the second terminal of the integrated circuit during a first time interval and a second voltage at the third terminal of the integrated circuit during a second time interval.

Example 5. The integrated circuit of one of examples 1 to 4, where, to control the power converter, the controller is configured to: compare the battery voltage to a first threshold voltage; and in response to the battery voltage falling below the first threshold voltage, decrease a duration of the second time interval.

Example 6. The integrated circuit of one of examples 1 to 5, where, to control the power converter, the controller is configured to: compare the second voltage to a second threshold voltage; and in response to the second voltage exceeding the second threshold voltage, decrease a duration of the second time interval.

Example 7. The integrated of one of examples 1 to 6, where, to control the power converter, the controller is configured to: compare the second voltage to the second threshold voltage; and in response to the second voltage falling below the second threshold voltage, increase a duration of the second time interval.

Example 8. The integrated circuit of one of examples 1 to 7, where, to control the power converter, the controller is configured to adjust a duration of the first time interval based on the increased or decreased duration of the second time interval.

Example 9. The integrated circuit of one of examples 1 to 8, where, in the second mode, the power converter is configured to charge an inductor during a third time interval, where the inductor is configured to couple to the first terminal of the integrated circuit, the second current path terminal of the first transistor, the second current path terminal of the second transistor, the first current path terminal of the third transistor, and the first current path terminal of the fourth transistor.

Example 10. The integrated circuit of one of examples 1 to 9, where the first time interval, the second time interval, and the third time interval include different, sequential intervals of time.

Example 11. The integrated circuit of one of examples 1 to 10, where, to control the power converter, the controller is configured to: compare the battery voltage to a first threshold voltage; and in response to the battery voltage falling below the first threshold voltage, disable the power converter circuit during a fourth time interval.

Example 12. The integrated circuit of one of examples 1 to 11, where the fourth time interval includes an interval of time after the second time interval and before the third time interval.

Example 13. The device of one of examples 1 to 12, where the first mode includes a single-input-multiple-output (SIMO) mode, and where the second mode includes a boost mode.

Example 17. The integrated circuit of one of examples 1 to 16, where the power converter is configured to receive a battery voltage from the second terminal of the integrated circuit, and where: in the first mode, the power converter is configured to output, based on the battery voltage, a first voltage at the second terminal during a first time interval and a second voltage at the third terminal of the integrated circuit during a second time interval; in the second mode, the power converter is configured to charge an inductor during a third time interval; and the inductor is configured to couple to the third terminal, the second current path terminal of the first transistor, the second current path terminal of the second transistor, the first current path terminal of the third transistor, and the first current path terminal of the fourth transistor.

Example 14. An integrated circuit, including: first, second, third, and fourth terminals; a power converter including: a first transistor having a control terminal, and first and second current path terminals; a second transistor having a control terminal, and first and second current path terminals; a third transistor having a control terminal, and first and second current path terminals; and a fourth transistor having a control terminal, and first and second current path terminals; and a controller configured to control the power converter; where the first terminal is coupled to a ground node; where the second terminal is configured to be coupled to a battery; where the second current path terminal of the first transistor is coupled to the third terminal, to the second current path terminal of the second transistor, to the first current path terminal of the third transistor, and to the first current path terminal of the fourth transistor; where the second current path terminal of the third transistor is coupled to the second terminal; where the second current path terminal of the fourth transistor is coupled to the third terminal; and where the controller is coupled to the fourth terminal and to the first terminal.

Example 15. The integrated circuit of example 14, further including reference voltage circuitry, a first voltage regulator, and a second voltage regulator, where: the reference voltage circuitry is coupled to the second current path terminal of the third transistor, the second terminal of the integrated circuit, and the first voltage regulator; the first voltage regulator is coupled to the second terminal of the integrated circuit, the reference voltage circuitry, and the third terminal of the integrated circuit; and the second voltage regulator is coupled to the third terminal of the integrated circuit, the fourth terminal of the integrated circuit, and the controller.

Example 16. The integrated circuit of one of examples 14 or 15, where the control terminals of the first, second, third, and fourth transistors of the power converter are coupled to receive sets of inputs from the controller, where, based on receiving a first set of inputs at the control terminals of the first, second, third, and fourth transistors, the power converter is configured to operate in a first mode, and where, based on receiving a second set of inputs at the control terminals of the first, second, third, and fourth transistors, the power converter is configured to operate in a second mode.

Example 18. A system, including: a first terminal configured to be coupled to a battery; second, third, and fourth terminals; a power converter including: a first transistor having a control terminal, and first and second current path terminals; a second transistor having a control terminal, and first and second current path terminals; a third transistor having a control terminal, and first and second current path terminals; and a fourth transistor having a control terminal, and first and second current path terminals; a controller configured to control the power converter; an inductor coupled to the first terminal; a first capacitor; a second capacitor; and a third capacitor; where the second current path terminal of the first transistor is coupled to the inductor, the second current path terminal of the second transistor, the first current path terminal of the third transistor, and the first current path terminal of the fourth transistor; where the second current path terminal of the third transistor is coupled to the second terminal; where the first capacitor is coupled to the second terminal; where the second current path terminal of the fourth transistor is coupled to the third terminal; where the second capacitor is coupled to the third terminal; where the controller is coupled to the fourth terminal and to the first terminal; and where the third capacitor is coupled to the fourth terminal.

Example 19. The system of example 18, further including reference voltage circuitry, a first voltage regulator, and a second voltage regulator, where: the reference voltage circuitry is coupled to the second current path terminal of the third transistor, the second terminal of the integrated circuit, and the first voltage regulator; the first voltage regulator is coupled to the second terminal, the reference voltage circuitry, and the third terminal of the integrated circuit; and the second voltage regulator is coupled to the third terminal, the fourth terminal of the integrated circuit, and the controller.

Example 20. The system of one of examples 18 or 19, where the control terminals of the first, second, third, and fourth transistors of the power converter are coupled to receive sets of inputs from the controller, where, based on receiving a first set of inputs at the control terminals of the first, second, third, and fourth transistors, the power converter is configured to operate in a first mode, and where, based on receiving a second set of inputs at the control terminals of the first, second, third, and fourth transistors, the power converter is configured to operate in a second mode.

The phrases "in some examples," "according to some examples," "in the examples shown," "in other examples," and the like generally mean the particular feature, structure, or characteristic following the phrase is included in at least one implementation of the present technology, and may be included in more than one implementation. In addition, such phrases do not necessarily refer to the same example or different examples.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while methods or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these methods or blocks may be implemented in a variety of different ways. Also, while methods or blocks are at times shown as being performed in series, these methods or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

What is claimed is:

1. An integrated circuit, comprising:
a first terminal configured to be coupled to a battery;
second, third, and fourth terminals;
a power converter comprising:
    a first transistor having a control terminal, and first and second current path terminals;
    a second transistor having a control terminal, and first and second current path terminals;
    a third transistor having a control terminal, and first and second current path terminals; and
    a fourth transistor having a control terminal, and first and second current path terminals; and
a controller configured to control the power converter;
wherein the second current path terminal of the first transistor is coupled to the first terminal, the second current path terminal of the second transistor, the first current path terminal of the third transistor, and the first current path terminal of the fourth transistor;
wherein the second current path terminal of the third transistor is coupled to the second terminal of the integrated circuit;

wherein the second current path terminal of the fourth transistor is coupled to the third terminal of the integrated circuit; and
wherein the controller is coupled to the fourth terminal of the integrated circuit.

2. The integrated circuit of claim 1, further comprising reference voltage circuitry, a first voltage regulator, and a second voltage regulator, wherein:
the reference voltage circuitry is coupled to the second current path terminal of the third transistor, the second terminal of the integrated circuit, and the first voltage regulator;
the first voltage regulator is coupled to the second terminal of the integrated circuit, the reference voltage circuitry, and the third terminal of the integrated circuit; and
the second voltage regulator is coupled to the third terminal of the integrated circuit, the fourth terminal of the integrated circuit, and the controller.

3. The integrated circuit of claim 1, wherein the control terminals of the first, second, third, and fourth transistors of the power converter are coupled to receive sets of inputs from the controller, wherein, based on receiving a first set of inputs at the control terminals of the first, second, third, and fourth transistors, the power converter is configured to operate in a first mode, and wherein, based on receiving a second set of inputs at the control terminals of the first, second, third, and fourth transistors, the power converter is configured to operate in a second mode.

4. The integrated circuit of claim 3, wherein the power converter is configured to receive a battery voltage from the first terminal of the integrated circuit, and wherein, in the first mode, the power converter is configured to output, based on the battery voltage, a first voltage at the second terminal of the integrated circuit during a first time interval and a second voltage at the third terminal of the integrated circuit during a second time interval.

5. The integrated circuit of claim 4, wherein, to control the power converter, the controller is configured to:
compare the battery voltage to a first threshold voltage; and
in response to the battery voltage falling below the first threshold voltage, decrease a duration of the second time interval.

6. The integrated circuit of claim 4, wherein, to control the power converter, the controller is configured to:
compare the second voltage to a second threshold voltage; and
in response to the second voltage exceeding the second threshold voltage, decrease a duration of the second time interval.

7. The integrated of claim 6, wherein, to control the power converter, the controller is configured to:
compare the second voltage to the second threshold voltage; and
in response to the second voltage falling below the second threshold voltage, increase a duration of the second time interval.

8. The integrated circuit of claim 7, wherein, to control the power converter, the controller is configured to adjust a duration of the first time interval based on the increased or decreased duration of the second time interval.

9. The integrated circuit of claim 4, wherein, in the second mode, the power converter is configured to charge an inductor during a third time interval, wherein the inductor is configured to couple to the first terminal of the integrated circuit, the second current path terminal of the first transistor, the second current path terminal of the second transistor, the first current path terminal of the third transistor, and the first current path terminal of the fourth transistor.

10. The integrated circuit of claim 9, wherein the first time interval, the second time interval, and the third time interval include different, sequential intervals of time.

11. The integrated circuit of claim 10, wherein, to control the power converter, the controller is configured to:

compare the battery voltage to a first threshold voltage; and in response to the battery voltage falling below the first threshold voltage, disable the power converter during a fourth time interval.

12. The integrated circuit of claim 11, wherein the fourth time interval includes an interval of time after the second time interval and before the third time interval.

13. The integrated circuit of claim 12, wherein the first mode includes a single-input-multiple-output (SIMO) mode, and wherein the second mode includes a boost mode.

14. An integrated circuit, comprising:

first, second, third, and fourth terminals;

a power converter comprising:

a first transistor having a control terminal, and first and second current path terminals;

a second transistor having a control terminal, and first and second current path terminals;

a third transistor having a control terminal, and first and second current path terminals; and a fourth transistor having a control terminal, and first and second current path terminals; and a controller configured to control the power converter;

wherein the first terminal is coupled to a ground node;

wherein the second terminal is configured to be coupled to a battery;

wherein the second current path terminal of the first transistor is coupled to the third terminal, to the second current path terminal of the second transistor, to the first current path terminal of the third transistor, and to the first current path terminal of the fourth transistor;

wherein the second current path terminal of the third transistor is coupled to the second terminal;

wherein the second current path terminal of the fourth transistor is coupled to the third terminal; and wherein the controller is coupled to the fourth terminal and to the first terminal.

15. The integrated circuit of claim 14, further comprising reference voltage circuitry, a first voltage regulator, and a second voltage regulator, wherein:

the reference voltage circuitry is coupled to the second current path terminal of the third transistor, the second terminal of the integrated circuit, and the first voltage regulator;

the first voltage regulator is coupled to the second terminal of the integrated circuit, the reference voltage circuitry, and the third terminal of the integrated circuit; and the second voltage regulator is coupled to the third terminal of the integrated circuit, the fourth terminal of the integrated circuit, and the controller.

16. The integrated circuit of claim 15, wherein the control terminals of the first, second, third, and fourth transistors of the power converter are coupled to receive sets of inputs from the controller, wherein, based on receiving a first set of inputs at the control terminals of the first, second, third, and fourth transistors, the power converter is configured to operate in a first mode, and wherein, based on receiving a second set of inputs at the control terminals of the first, second, third, and fourth transistors, the power converter is configured to operate in a second mode.

17. The integrated circuit of claim 3, wherein the power converter is configured to receive a battery voltage from the second terminal of the integrated circuit, and wherein:

in the first mode, the power converter is configured to output, based on the battery voltage, a first voltage at the second terminal during a first time interval and a second voltage at the third terminal of the integrated circuit during a second time interval;

in the second mode, the power converter is configured to charge an inductor during a third time interval; and the inductor is configured to couple to the third terminal, the second current path terminal of the first transistor, the second current path terminal of the second transistor, the first current path terminal of the third transistor, and the first current path terminal of the fourth transistor.

18. A system, comprising:

a first terminal configured to be coupled to a battery;

second, third, and fourth terminals;

a power converter comprising:

a first transistor having a control terminal, and first and second current path terminals;

a second transistor having a control terminal, and first and second current path terminals;

a third transistor having a control terminal, and first and second current path terminals; and a fourth transistor having a control terminal, and first and second current path terminals;

a controller configured to control the power converter;

an inductor coupled to the first terminal;

a first capacitor;

a second capacitor; and a third capacitor;

wherein the second current path terminal of the first transistor is coupled to the inductor, the second current path terminal of the second transistor, the first current path terminal of the third transistor, and the first current path terminal of the fourth transistor;

wherein the second current path terminal of the third transistor is coupled to the second terminal;

wherein the first capacitor is coupled to the second terminal;

wherein the second current path terminal of the fourth transistor is coupled to the third terminal;

wherein the second capacitor is coupled to the third terminal;

wherein the controller is coupled to the fourth terminal and to the first terminal; and wherein the third capacitor is coupled to the fourth terminal.

19. The system of claim 18, further comprising reference voltage circuitry, a first voltage regulator, and a second voltage regulator, wherein:

the reference voltage circuitry is coupled to the second current path terminal of the third transistor, the second terminal of the system, and the first voltage regulator;

the first voltage regulator is coupled to the second terminal, the reference voltage circuitry, and the third terminal of the system; and the second voltage regulator is coupled to the third terminal, the fourth terminal of the system, and the controller.

20. The system of claim 19, wherein the control terminals of the first, second, third, and fourth transistors of the power converter are coupled to receive sets of inputs from the controller, wherein, based on receiving a first set of inputs at the control terminals of the first, second, third, and fourth transistors, the power converter is configured to operate in a first mode, and wherein, based on receiving a second set of inputs at the control terminals of the first, second, third, and fourth transistors, the power converter is configured to operate in a second mode.

* * * * *